(12) United States Patent
Howard

(10) Patent No.: US 9,851,949 B2
(45) Date of Patent: Dec. 26, 2017

(54) SYSTEM AND METHOD FOR AUTOMATIC SOFTWARE APPLICATION CREATION

(71) Applicant: Kevin D. Howard, Tempe, AZ (US)

(72) Inventor: Kevin D. Howard, Tempe, AZ (US)

( * ) Notice: Subject to any disclaimer, the term of this patent is extended or adjusted under 35 U.S.C. 154(b) by 0 days.

(21) Appl. No.: 14/877,906

(22) Filed: Oct. 7, 2015

(65) Prior Publication Data

US 2016/0162266 A1  Jun. 9, 2016

Related U.S. Application Data

(60) Provisional application No. 62/060,701, filed on Oct. 7, 2014.

(51) Int. Cl.
*G06F 9/44* (2006.01)
*G06F 9/45* (2006.01)

(52) U.S. Cl.
CPC .............. *G06F 8/10* (2013.01); *G06F 8/36* (2013.01); *G06F 8/40* (2013.01)

(58) Field of Classification Search
CPC .............. G06F 8/10; G06F 8/36; G06F 8/40
USPC ........................................................ 717/105
See application file for complete search history.

(56) References Cited

U.S. PATENT DOCUMENTS

| | | | | |
|---|---|---|---|---|
| 5,390,325 A * | 2/1995 | Miller | ................. | G06F 11/3688 714/38.14 |
| 5,956,513 A * | 9/1999 | McLain, Jr. | .............. | G06F 8/71 717/142 |
| 7,228,524 B2 * | 6/2007 | Bailey | ................. | G06F 11/3696 714/38.1 |
| 8,438,532 B2 * | 5/2013 | Fox | ........................... | G06F 8/36 717/100 |
| 8,549,514 B2 * | 10/2013 | Carteri | ..................... | G06F 8/61 717/103 |
| 9,317,260 B2 * | 4/2016 | Balachandran | .......... | G06F 8/36 |
| 2003/0028860 A1 * | 2/2003 | Sumida | .............. | G06F 11/3628 717/125 |
| 2008/0082933 A1 | 4/2008 | Howard et al. | | |
| 2009/0055625 A1 | 2/2009 | Howard et al. | | |
| 2010/0049941 A1 | 2/2010 | Howard | | |
| 2010/0183028 A1 | 7/2010 | Howard et al. | | |
| 2010/0251259 A1 | 9/2010 | Howard | | |
| 2010/0325388 A1 | 12/2010 | Howard | | |
| 2012/0036399 A1 | 2/2012 | Howard | | |
| 2012/0066664 A1 | 3/2012 | Howard | | |
| 2012/0101929 A1 | 4/2012 | Howard | | |
| 2013/0254751 A1 | 9/2013 | Howard | | |
| 2013/0311543 A1 | 11/2013 | Howard | | |
| 2013/0325750 A1 | 12/2013 | Howard | | |
| 2013/0325860 A1 | 12/2013 | Howard | | |

(Continued)

FOREIGN PATENT DOCUMENTS

| | | | |
|---|---|---|---|
| WO | 0101219 A2 | 1/2001 | |
| WO | 03060748 A2 | 7/2003 | |

(Continued)

*Primary Examiner* — Ted T Vo
*Assistant Examiner* — Lanny Ung
(74) *Attorney, Agent, or Firm* — Skaar Ulbrich Macari, P.A.

(57) ABSTRACT

Systems, methods, and computer program products are provided for automatically finding, testing, and attaching code directly to software requirements. The requirements can be used to define, find, test and attach files and input/output interface displays to create new software applications.

20 Claims, 19 Drawing Sheets

(56) References Cited

U.S. PATENT DOCUMENTS

| | | |
|---|---|---|
| 2013/0332777 A1 | 12/2013 | Howard |
| 2013/0332903 A1 | 12/2013 | Howard |
| 2013/0332904 A1 | 12/2013 | Howard |
| 2013/0346807 A1 | 12/2013 | Howard |
| 2014/0025430 A1 | 1/2014 | Howard |
| 2014/0068464 A1 | 3/2014 | Howard et al. |
| 2014/0125683 A1 | 5/2014 | Howard |
| 2014/0198196 A1 | 7/2014 | Howard et al. |
| 2014/0282412 A1 | 9/2014 | Howard |
| 2014/0298286 A1 | 10/2014 | Howard |
| 2014/0304684 A1 | 10/2014 | Howard |
| 2014/0310678 A1 | 10/2014 | Howard |
| 2014/0310680 A1 | 10/2014 | Howard |
| 2014/0310684 A1 | 10/2014 | Howard |
| 2014/0310689 A1 | 10/2014 | Howard |
| 2014/0344773 A1 | 11/2014 | Howard |
| 2014/0372966 A1 | 12/2014 | Howard |
| 2015/0149535 A1 | 5/2015 | Howard |
| 2016/0085512 A1 | 3/2016 | Howard |
| 2016/0148102 A1 | 5/2016 | Howard |
| 2016/0188299 A1 | 6/2016 | Howard |
| 2016/0226658 A1 | 8/2016 | Howard |

FOREIGN PATENT DOCUMENTS

| | | |
|---|---|---|
| WO | 2005111843 A2 | 11/2005 |
| WO | 2012021523 A2 | 2/2012 |
| WO | 2012024435 A2 | 2/2012 |
| WO | 2013036824 A2 | 3/2013 |
| WO | 2013184952 A1 | 12/2013 |

\* cited by examiner

Norwegian Mountain Trip

Executed HTML Code Attached to a Terminator

*Control Condition Defining File Activity*

*Hierarchical Decomposition Graph Highlighting Data Stores*

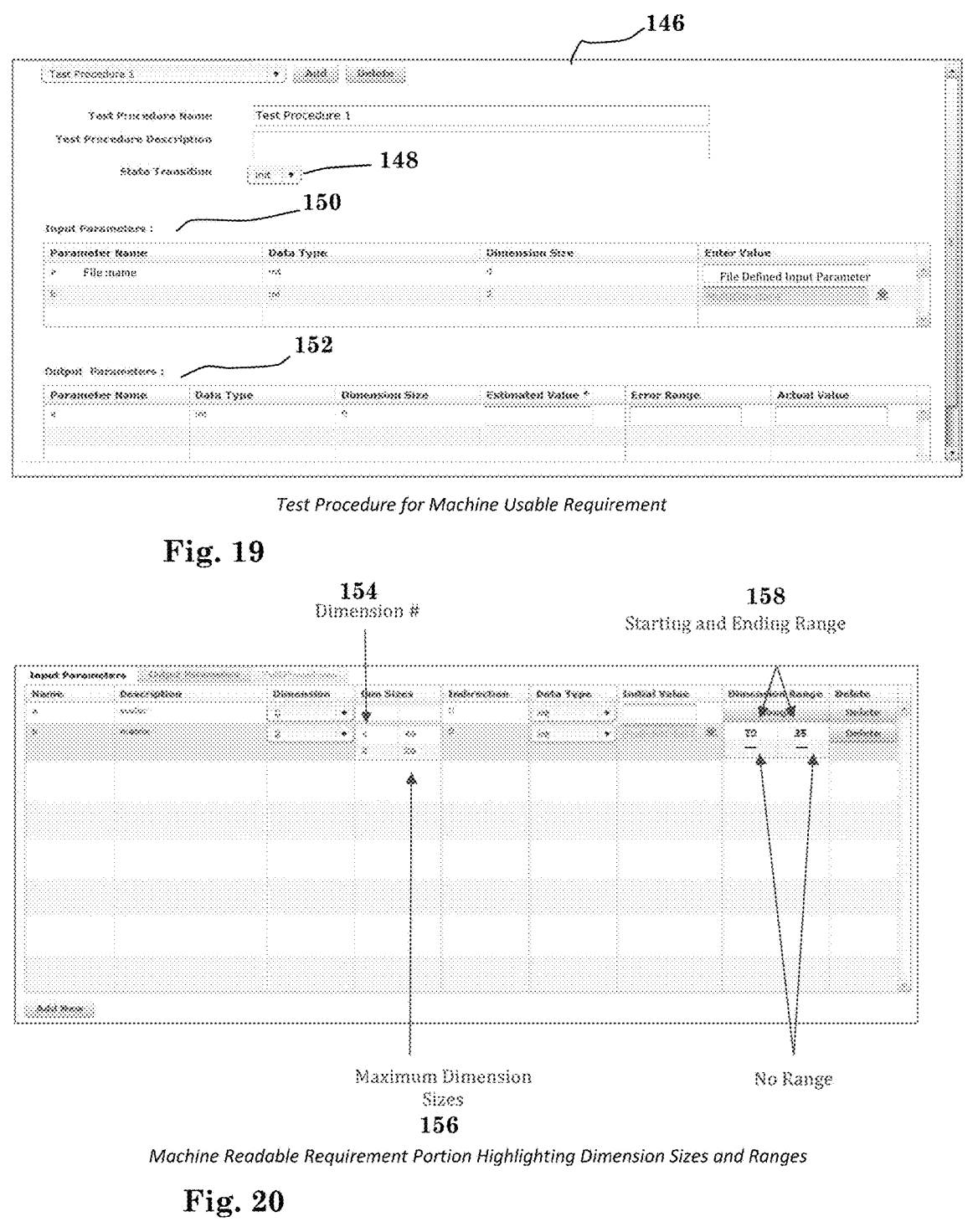

*Test Procedure for Machine Usable Requirement*

Fig. 19

*Machine Readable Requirement Portion Highlighting Dimension Sizes and Ranges*

Fig. 20

*Machine Readable Requirement Portion Highlighting Indirection*

Fig. 21

*Machine Readable Requirement Portion Highlighting Initial Value*

Fig. 22

*Machine Readable Requirement Portion Highlighting Structure Parameter Use*

Fig. 23

*Standard I/O Character Read and Write Designation*

Fig. 24

*Machine Readable Requirement Portion Highlighting File Record Parameters and Control Flow Selector*

*Hierarchical Search Requirements Structure*

*Found Code Hierarchical Requirement Structure*

SYSTEM AND METHOD FOR AUTOMATIC SOFTWARE APPLICATION CREATION

RELATED APPLICATIONS

This Application claims priority to and the benefit of U.S. Provisional Patent Application No. 62/060,701, filed Oct. 7, 2014, which is fully incorporated herein by reference.

TECHNICAL FIELD

The present invention relates generally to systems, methods, and computer programs for software application creation.

BACKGROUND OF THE INVENTION

Conventional methods and services show that there are two components of software requirements: human-readable and machine-usable. The machine-usable components can be thought of as the test procedures needed to ensure that the human-readable requirements have been met. Typically, the purpose of a set of software requirements is the construction of a software application, one that meets those requirements. Conventional requirements can be linked to design which, in turn, are linked to code.

Accordingly, there exists the opportunity to create new applications directly from requirements, removing the need for human intervention.

SUMMARY OF THE INVENTION

Particular embodiments of the present invention are directed to constructing or creating a software application from hierarchical requirements by linking code to said requirements, bypassing the need for software design. The present invention uses a code's structure and comments to act as the human-readable portion of a requirement and provides a method to use machine-usable software-requirement components to find code and link code together, completing the creation of an application that will meet those requirements.

The system and methods of the present invention take advantage of the continued need for requirements in the creation and testing of software. By building a correspondence between traditional design graph methods and requirements it is possible to use many of the analysis tools inherent to graphic design methods without resorting to those methods. Software requirements can be created manually through a user interface, automatically from existing source code (used for code migration and modernization), or a combination of both. Associating existing source code to its extracted requirement allows for timing requirements to be obtained. Once the detailed requirements are found or created, they can be used to automatically locate code that meets those requirements, and testing new code against the software requirements for acceptance.

Once a requirement is extracted or created it can be used to find source code that has been previously stored, either in local memory, local disk, network attached storage, or the Internet/cloud. The found source code is converted into executable form. The input and output data types of the candidate source code are compared against the software requirement's indicated input and output data types. If there is a match then input data values associated with the requirement can be used as input to the found code, and the executable of the found code is executed. Execution timings can be taken from the executed code. The output and timings of the executed code is compared to that of the software requirement. If there is a match then the found code can be associated with the requirement.

As such, systems, methods, and computer program products are provided for automatically extracting requirements from existing code as well as automatically finding, testing, and attaching code directly to software requirements, wherein the requirements can be used to define, find, test and attach files and input/output interface displays to form new applications.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure and to enable a person skilled in the pertinent art to make and use the embodiments disclosed herein. In the drawings, like reference numbers indicate identical or functionally similar elements.

FIG. 4 shows a user interface and machine usable requirement component tabs and information, in accordance with exemplary embodiments of the present invention.

FIG. 5 shows a user interface and control flow and condition information, in accordance with exemplary embodiments of the present invention.

FIG. 19 shows a user interface of a test procedure for machine usable requirements, in accordance with exemplary embodiments of the present invention.

FIG. 20 shows a user interface highlighting dimension sizes and ranges of a machine readable requirement, in accordance with exemplary embodiments of the present invention.

FIG. 21 shows a user interface highlighting indirection of a machine readable requirement, in accordance with exemplary embodiments of the present invention.

FIG. 22 shows a user interface highlighting initial value of a machine readable requirement, in accordance with exemplary embodiments of the present invention.

FIG. 23 shows a user interface highlighting structure parameter use of a machine readable requirement, in accordance with exemplary embodiments of the present invention.

FIG. 24 shows a user interface depicting standard input and output character read and write designations, in accordance with exemplary embodiments of the present invention.

DETAILED DESCRIPTION

Referring generally to FIGS. 1-28, exemplary systems, methods, and computer program products for automatically extracting requirements from existing code and automatically constructing and creating software applications are disclosed. The software system 10 of the present invention automatically finds, tests, and attaches code directly to software requirements, with the software requirements used to define, find, test and attach files and input/output interface displays to form new applications.

System Overview

Figure 1:
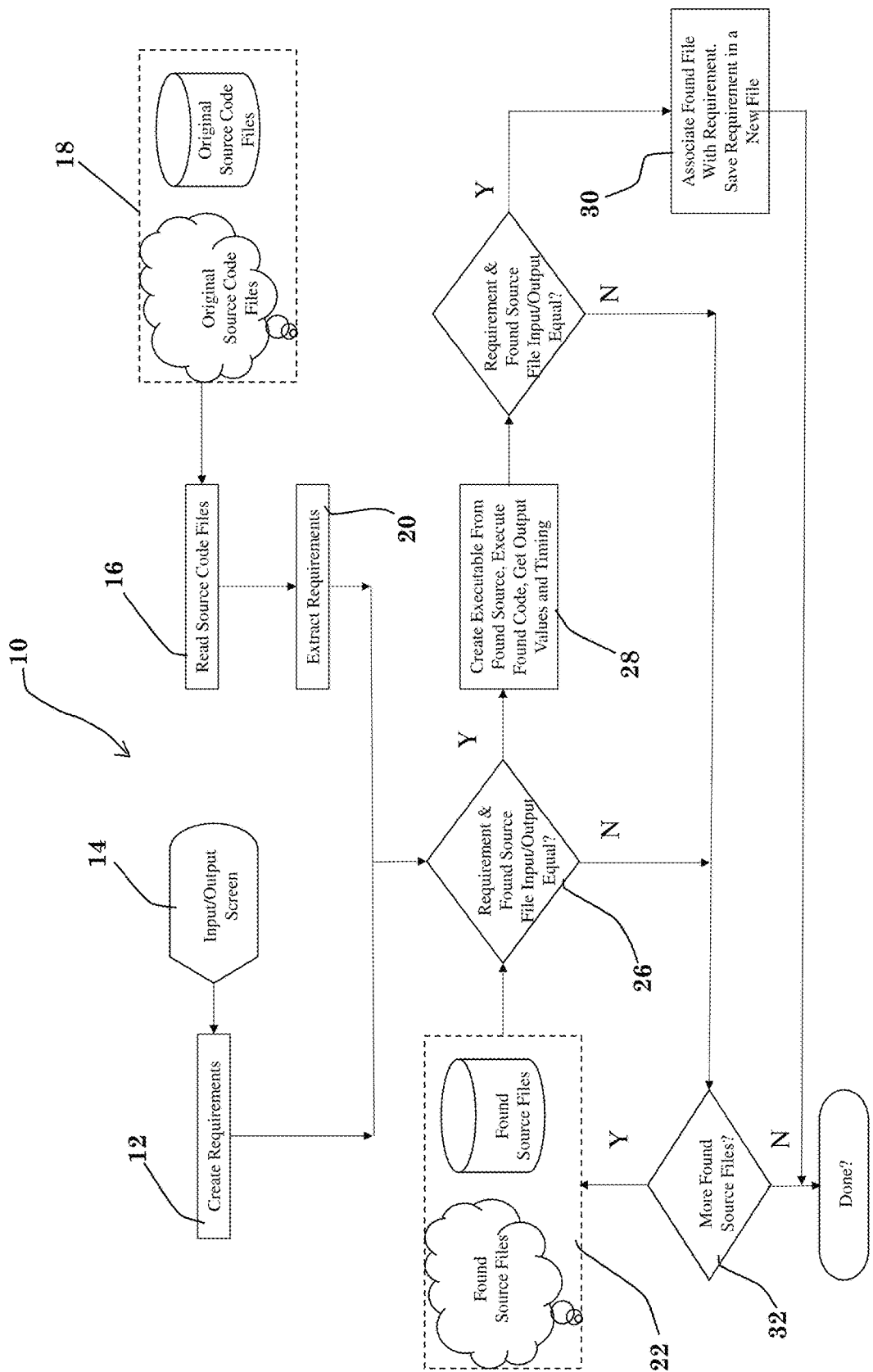
FIG. 1 is a process flowchart of a system and method for automatic software application creation, in accordance with exemplary embodiments of the present invention.

Referring to FIG. 1, steps and processing methods in accordance with embodiments of the software system 10 are provided. The user first determines if software requirements are to be manually written or extracted from some original source code. If the requirements are manually written/created then a user interface is accessed and displayed at steps 12, 14, including the requirement text, input/output data types, work breakdown structure, input values and expected output values, and expected processing times for each requirement. If the software requirements are extracted from original source code or other target means at step 16 then a list of the source code files from either a local or internet storage location 18 is accessed from a provided and displayed user interface. The requirements are automatically extracted from information contained in the source code at step 20. The source code that is the source of the requirement is then processed, converted to executable form, and displayed through a user interface at step 22. The extracted software requirement information plus input values, expected output values and timings are saved as the full software requirement.

A source of source-code functions is searchable and accessible either from remote (e.g., network), local, or Internet/cloud storage devices or systems at step 24. The input and output data types are compared against those in the requirement at step 26. If the input and output data types match then an executable form of the found source-code functions is created and executed at step 28 using the input values, getting output values and timings. If the output values and timings match those in the requirement then the found source code is associated with the requirement at step 30 and the requirement, source code, and executable codes are saved in a file or database for future use. Processing is generally complete at this point in the system.

If either the input or output data types do not match, or the output data values do not match, or the processing timing does not match, then the current found source code is not associated with the requirement. It is determined if other found source files are present at step 32. If so, then the new found source files are further tested for compatibility at step 22, thereby repeating the computing process. If there are no further found source codes then processing is complete without associating code with the software requirement.

Software Requirements

Software requirements are used to define what a software application must accomplish in order to consider that application a solution to some problem. Typically, multiple requirements are needed for the definition. A set of requirements represents everything that is needed of the application to meet its goal. In general, the minimum information used to describe a set of requirements is the application name, associated skills list, and the application description.

| Application Name | Skills List | Description |
|---|---|---|
| alphanumeric | $skill_1$, $skill_2$, ..., $skill_n$ | text |

The application name identifies the finished application and must be associated with the requirements group so that the requirements and the finished application are associated. The application-associated skills list is a list of those skills needed to complete the application. Examples include the target language (e.g., C, C++, JAVA, Perl, HTML, etc.), the target platform (e.g., iPhone, Droid, Microsoft Windows, Linux, etc.), the application-licensing model, and the target market (e.g., image processing, music players, photo storage, oil and gas exploration). The application description is a human-readable text string describing the finished application. Like the application name, this description is associated with both the group of requirements and the final software application.

Figure 2:
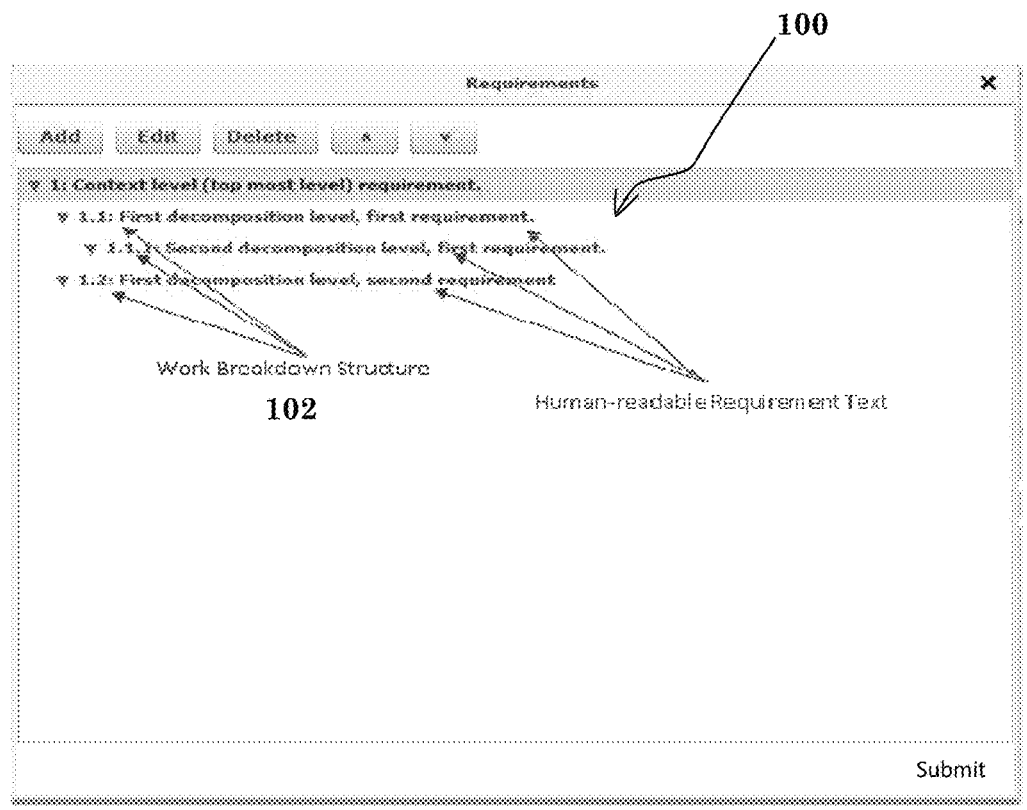
FIG. 2 shows a user interface and human-readable software requirement, in accordance with exemplary embodiments of the present invention.

Software requirements have two components: human-readable and machine-usable. The human-readable component of a requirement has two parts: the work-breakdown structure and a text string. The associated work-breakdown structure is used to define the hierarchy of the components of the application. FIG. 2 shows an example of human-readable requirements 100.

Figure 2A:
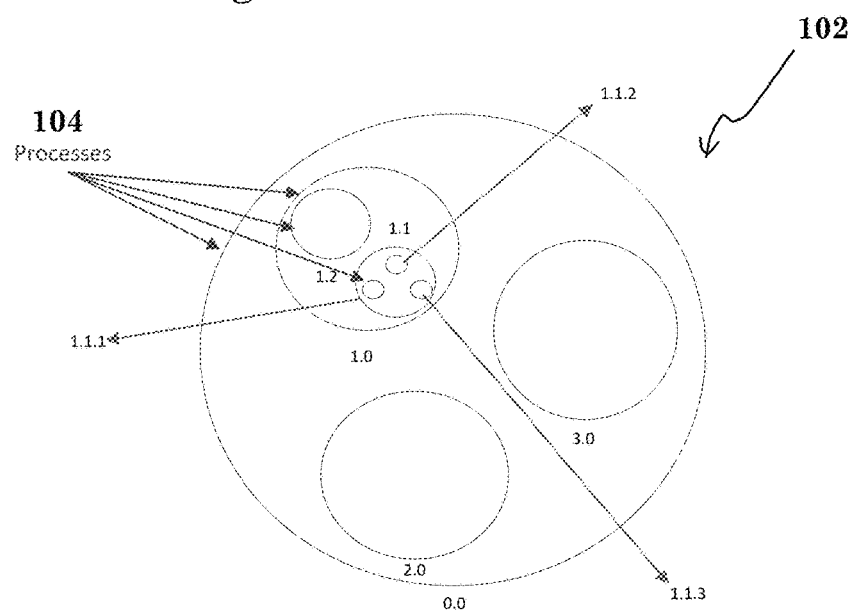
FIG. 2A shows a hierarchical decomposition graph of a work breakdown structure, in accordance with exemplary embodiments of the present invention.

Referring to FIG. 2A, the work-breakdown structure 102 (0.0, 1.0, 1.1, 1.1.1, 1.1.2, 1.2, 2.0, 3.0) can be thought of as a hierarchical decomposition graph of processes, with each process 104 equal to a code block. A single high-level process can contain multiple lower-level processes. Similarly, a single high-level code block can contain multiple lower-level code blocks.

Text String Extraction from Source Code

The text string part of the human-readable component of a requirement is a description of the activity defined by the requirement. Software is organized in a way similar to requirements: "code" is equivalent to the machine-usable component and "comments" are generally equivalent to the human-readable component.

Figure 3:
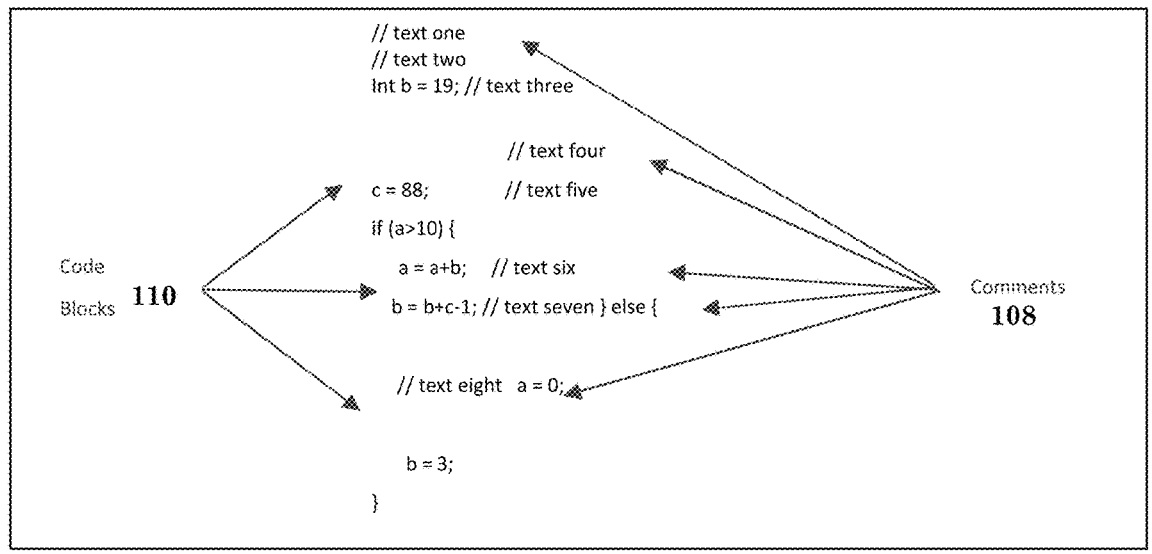
FIG. 3 shows highlighted code blocks and comments, in accordance with exemplary embodiments of the present invention.

FIG. 3 shows an exemplary "C" computer-language code section. This code excerpt shows eight human-readable comments 108—"//text one" through "//text eight"—contained within three code blocks 110. Note that there are different comments for each code block. Notice also that within the first code block there are five comments, within the second code block there are two comments, and within the third code block there is one comment. Moreover, there are discernible patterns to the comments: there are comments that are unassociated with particular lines of code, comments that are associated with particular lines of code, and comments that are associated with other comments.

The first comment in FIG. 3, "text one", is unassociated with particular lines of code. This means that the first comment encompasses all of the code blocks thereunder until another code-unassociated comment is encountered. Any work-breakdown number associated with this comment will be at a higher level than any number associated with comments within that comment. The second comment, "text two", is associated with the first comment as there are no intervening lines of code. Therefore, the computing system treats the first two comments as a single comment.

The third comment, "text three", is associated with the code line "int b=19;" which, because of the "int" type definition keyword, defines variable "b". Since this comment is associated with a variable-definition line of code, it is used in the parameter-description portion of the machine-usable component, not with the human-readable portion of the requirement. The fourth comment, "text four", is associated with the third comment because there are no intervening lines of code.

The fifth comment, "text five", is associated with a line of code, "c=88". Because this line of code does not define a variable, "no type definition keyword", it represents its own human-readable portion. The associated work-breakdown number is lower than that given to the first two comments. If the first two comments have the work-breakdown number "1.0" then the fifth comment would have "1.1".

The sixth and seventh of FIG. 3 comments, "text six" and "text seven", are both within the second code block. This means that together they represent the human-readable portion of the requirement for code block two.

The eighth and last comment, "text eight" is unassociated with particular lines of code but occurs within a particular code block. This means that this comment represents the human-readable portion of the requirement for code block three.

Figure 3A:
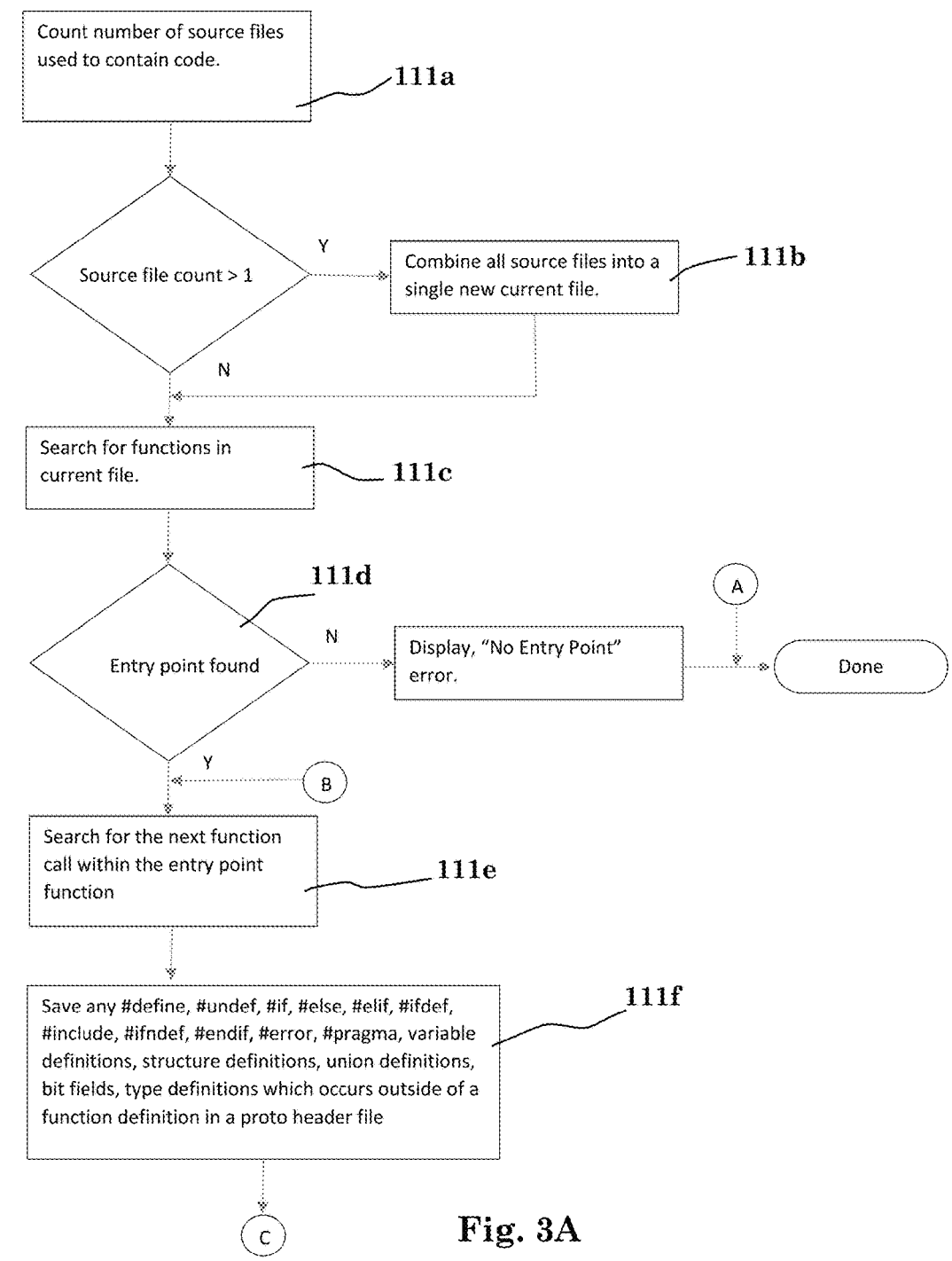
FIGS. 3A-3B is a process flowchart of text string extraction from code, in accordance with exemplary embodiments of the present invention.
Figure 3B:
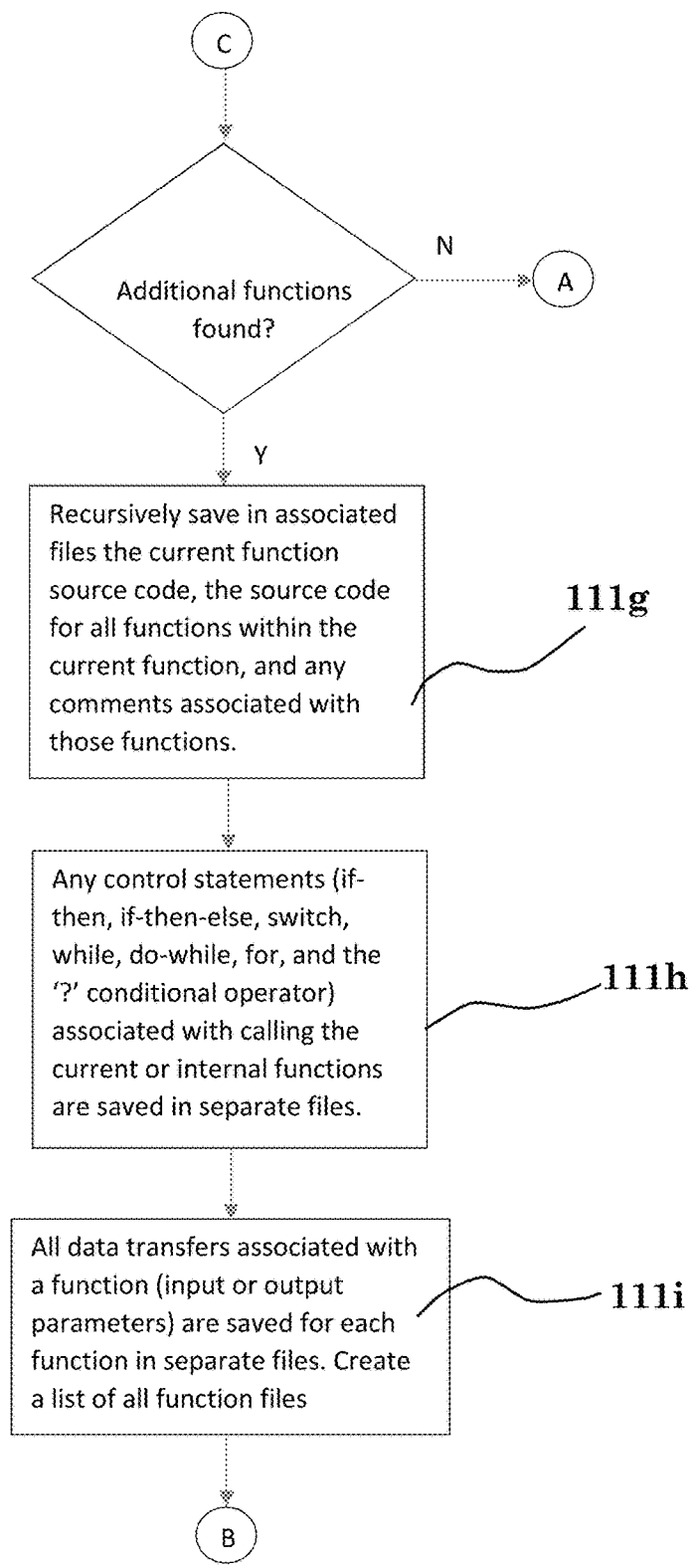

Taken together, this information gives the following list of human-readable requirements:

1.0 Text One and Text Two
1.1 Text five
1.2 Text six and text seven
1.3 Text eight As shown in FIGS. 3A-3B, the system 10 determines if there are multiple source files for the existing application at step 11a. If there are, the plurality of source files are combined into a single, integrated file for analysis at step 111b. Further, the system will search the single, integrated file for the entry point of the application at step 111c.—e.g., for C, C++, C#, or Java, the entry point is a function called MAIN. If no entry point is found at step 11d then the application cannot form an executable, and will generate an error and stop processing. If an entry point is found then the system will search for the next function call within the entry point function at step 111e, and create a single, separate header file at step 111f—the header file will be used to allow for the separate compilation of source file functions. The system will then recursively find all functions plus their place in the hierarchy of functions, any control code required to determine the calling order of the function, and the I/O of the functions, with all information saved at step 111g, Each source file function plus the integrated header file information, the control sequence needed to active the function, the function I/O, and a specially generated entry point for the function is combined into a file—one file per source function—at step 111h. Then, the system will end processing when no additional functions are available for processing at step 111i.

Source Header Extraction

A source header is a block of comments that is typically associated with files containing multiple associated modules or subroutines. Embedded keywords are used to identify the part of the comment that describes the overall purpose of the associated modules or subroutines. The overall purpose can be used as the high-level requirement which encapsulates the associated modules or subroutines. Examples of embedded keywords include:

Comments, Comments:, Comments —, Description, Description:, Description —, Purpose, Purpose:, Purpose —, Runtime, Runtime:, Runtime —, <Runtime>, <source-Desc>, and <summary>.

The overall-purpose text is typically surrounded by a blank comment line, the end of the comment field, the detection of the next keyword, a comma, or the like.

Figure 3C:
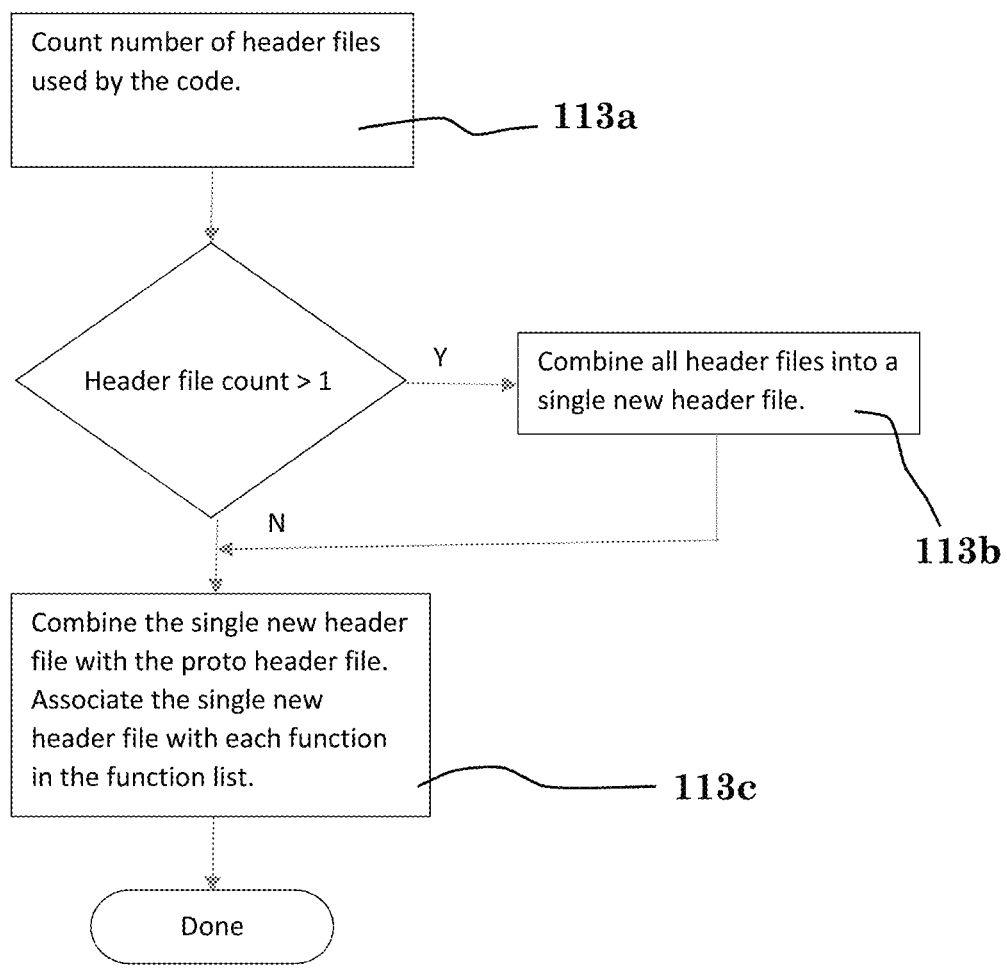
FIG. 3C is a process flowchart of source header extraction, in accordance with exemplary embodiments of the present invention.

FIG. 3C shows a process flowchart for source header extraction. First, the system 10 determines if there are multiple header files for the existing application at step 113a.

If so, it will combine them into a single, integrated file, at step 113*b*. Further, the integrated header files are combined with header information per function at step 113*c*.

Human Readable and Machine Usable Components

Figure 3D:
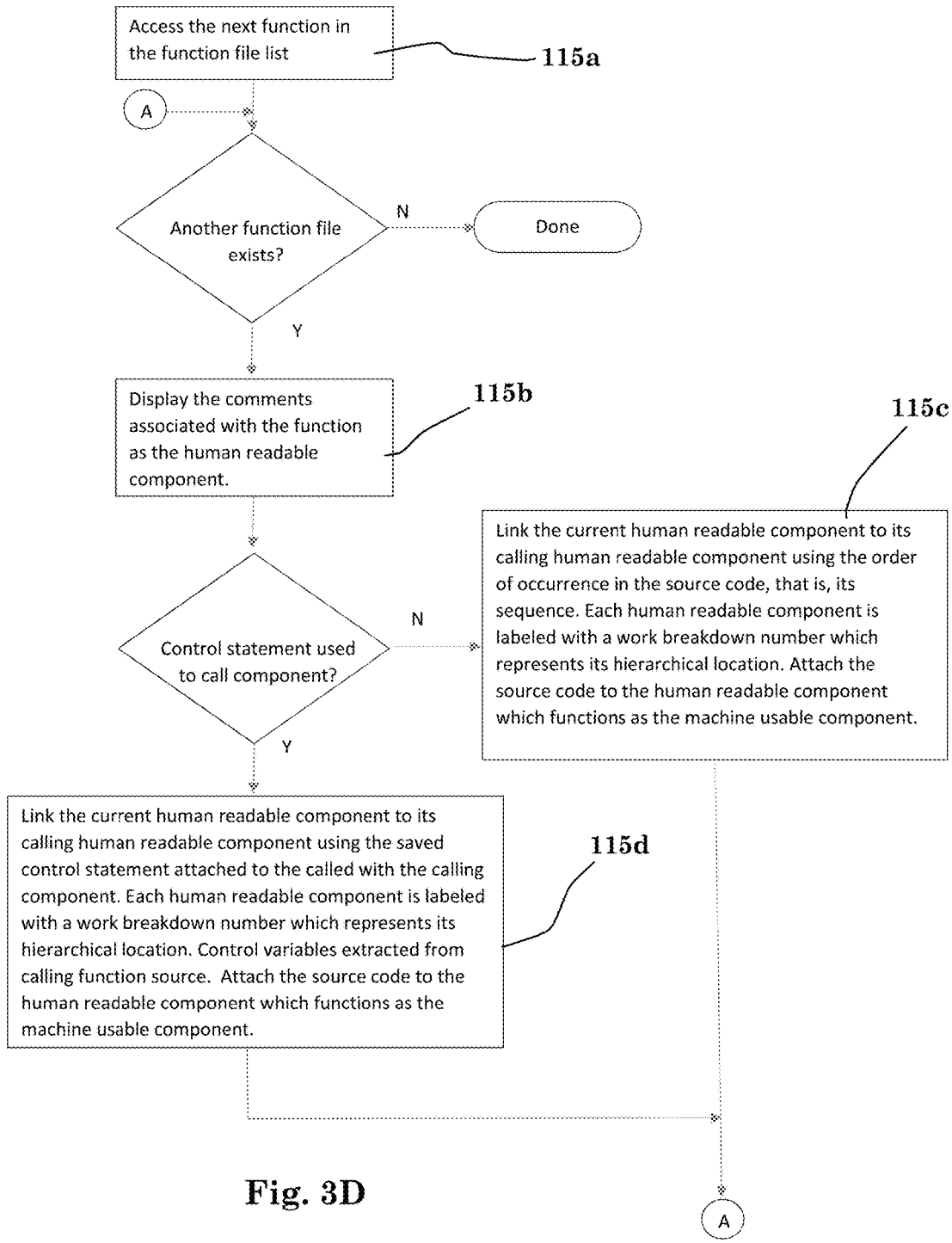
FIG. 3D is a flowchart of human readable and machine usable component processing, in accordance with exemplary embodiments of the present invention.

Referring to the flowchart of FIG. 3D, the system 10 can access the next function from a list of existing functions, from existing source code, at step 115*a*. If there are no more functions then the subject process is complete. If there are more functions the source code comments will be extracted and displayed at step 115*b* as the "human-readable" portion of the software requirement. The source code structure determines how the requirements are linked together—e.g., how the control statements in the source code order the functions within the current function. If a control statement is not used to call a component, then the current human readable component is linked to its calling human readable component using the order of occurrence in the source code—its sequence—at step. 115*c*. If a control statement is used to call a component, then the current human readable component is linked to its calling human readable component using the saved control statement attached to the call with the calling component, at step 115*d*. These linkages are the machine-usable portion of the requirement. In order for a computer to be able to use the linkages the variables, constants, I/O, and files associated with the control statements are also extracted.

Describing Machine Usable Component

Figures 4, 5:
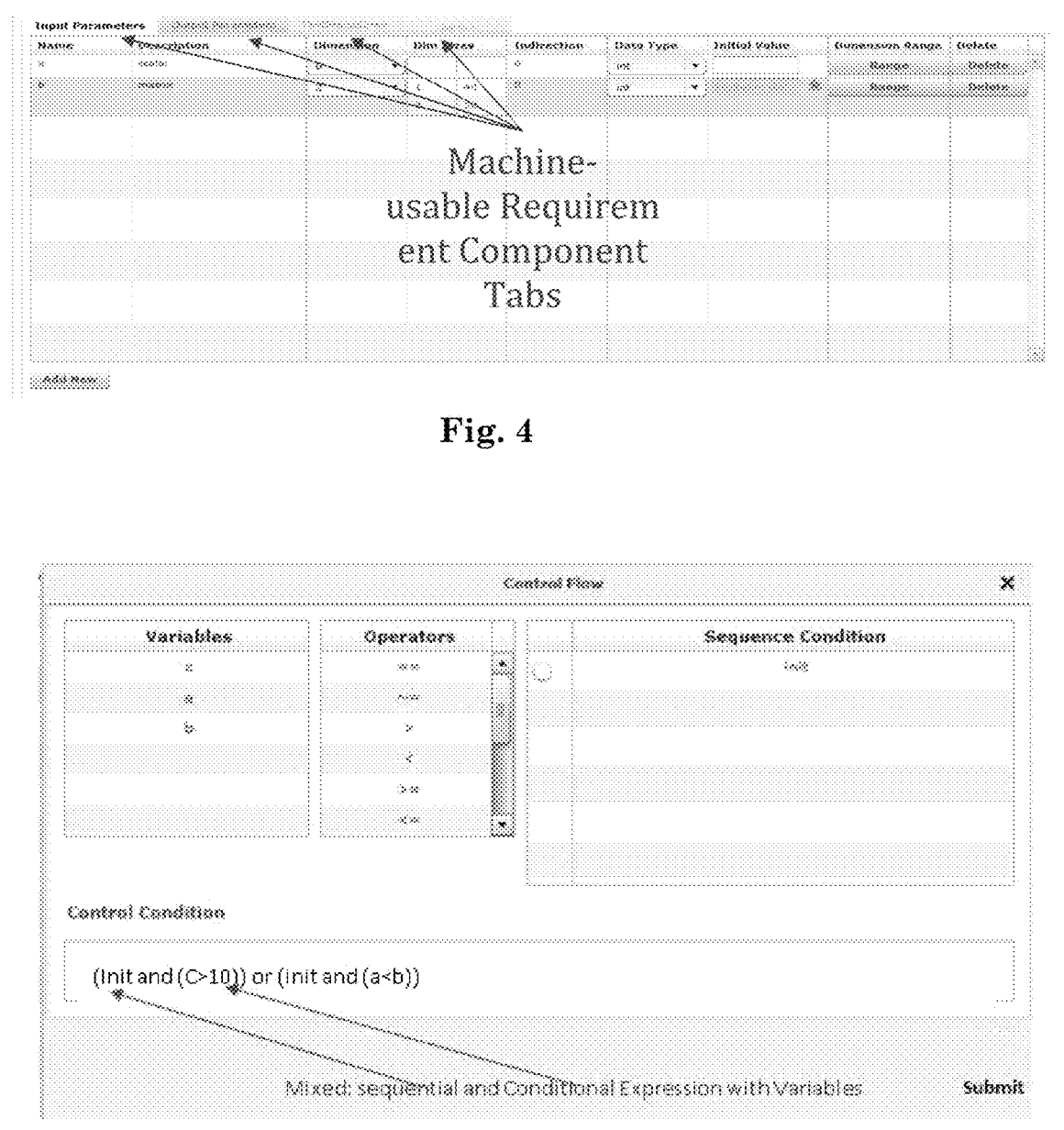

The machine-usable component of the requirement consists of a control, input and output variables, and test procedures, as shown in FIG. 4.

Control

Referring generally to FIG. 5, there are three types of control: sequential, conditional, and mixed. Sequential control follows the current requirement or "INIT" which indicates that this is the first, or initial, requirement that is accessed. Conditional control consists of "regular expressions" that can be evaluated into Boolean conditional terms. If the Boolean conditional terms evaluate to true then the machine-usable part of the requirement is accessed. Mixed control consists of both sequential and conditional control.

Figure 6:
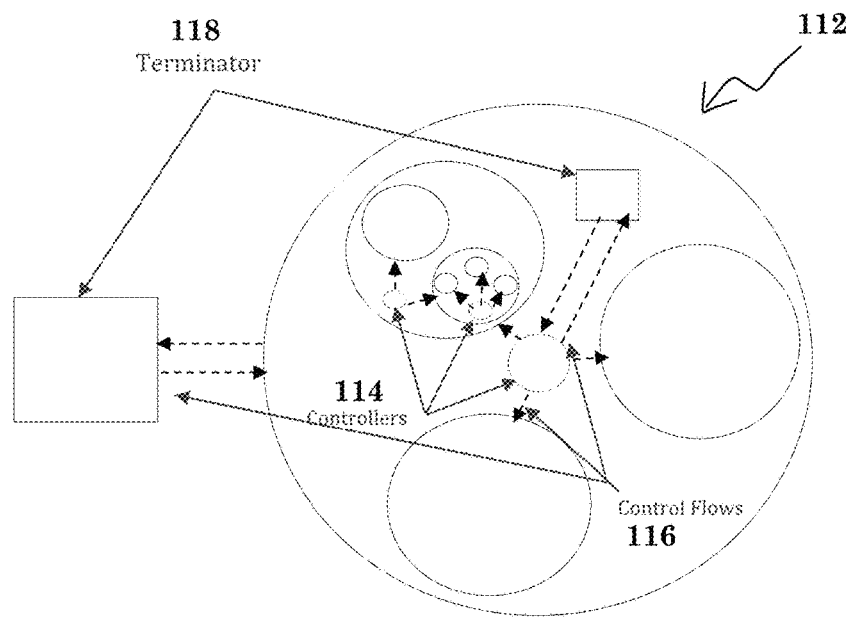
FIG. 6 shows a hierarchical decomposition graph highlighting control, control flow, and terminators, in accordance with exemplary embodiments of the present invention.

The control conditions 112 of FIG. 6 show the conditions under which a software requirement is activated. Graphically, the conditions are coordinated via a structure called a control process 114. The condition itself is located on a structure called a control flow 116 (shown as dashed arrows). Control usually originates from outside of the application, shown by the terminator graphical structure 118.

Terminators 118 represent the primary interface between the systems and people outside of the application and the logic inside of the application. A terminator 118 can act as a display (e.g., printf, scanf sequence in the C programming language, HTML code, etc.). Terminators 118 can also define input and output variables as well as send and receive control signals (e.g., init, return). Since a terminator 118 is defined as interfacing, or facilitating interaction between, the outside world with the application and since the top-level (0.0) work-breakdown number represents the entire application, the terminator 118 must be associated with that top-level number.

Figure 7:
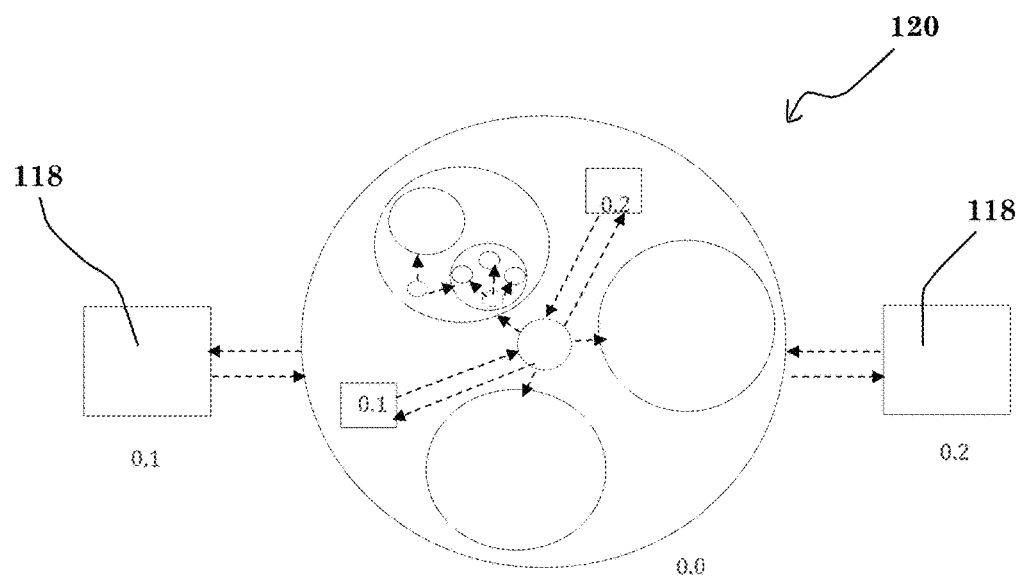
FIG. 7 shows a hierarchical decomposition graph highlighting the topmost level work breakdown structure and positioning, in accordance with exemplary embodiments of the present invention.

FIG. 7 depicts hierarchical decomposition 120, highlighting the topmost level work breakdown structure and positioning. The terminator 118 is the origin of externally defined control conditions. Therefore, each group of externally originating control conditions is associated with a software requirement. This indicates that the topmost level of the hierarchical decomposition graph can have multiple requirement sets and thus multiple terminators 118. Multiple requirement sets at the topmost level (0.0) can be designated as follows: 0.1, 0.2, ..., 0.n. FIG. 7 shows the hierarchical graph with work-breakdown numbers 0.0, 0.1, and 0.2.

The variables found and used by the control conditions are defined by the input and output variables associated with the machine-usable requirements. This indicates that there must be at least two topmost level work breakdown numbers, 0.0 and 0.1, allowing the creation of the topmost hierarchical decomposition level of the application and at least one terminator to initialize the application. Even though terminators are defined as external to the application, the variables and the control to and from them can be accessed at lower levels of decomposition. For convenience, whenever the data or control of a terminator is used in a lower level of decomposition, it is repeated on that level.

Input and Output Variables

There are three classes of input/output (I/O) variables: terminator, files, and data store. The input variables describe the prerequisite information structures required to activate the software requirement. The output variables describe any new or changed information structures that occur as a response to performing the required activity. Together these variables are called input or output parameters. A variable consists of the following: variable name, description, number of dimensions, dimensional sizes, the number of indirections, data type, initial value, and dimensional range. All of the input and output variables associated with a single requirement are considered one structure.

Figures 8, 9, 10:
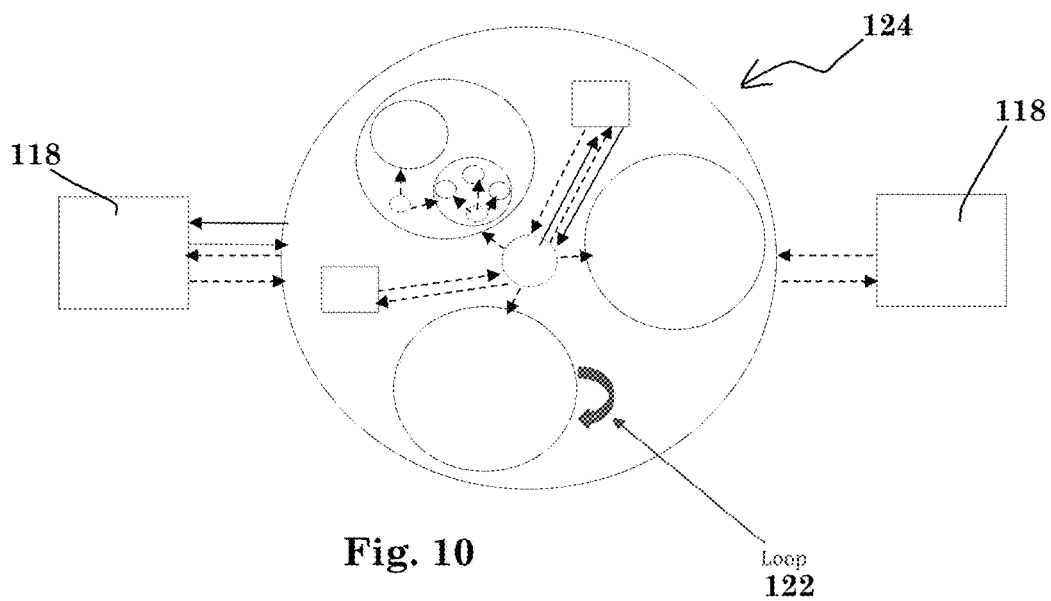
FIG. 8 shows a user interface and data columns including name, description, dimension, dimension size, indirection, data type, initial value, dimension range, and the like, in accordance with exemplary embodiments of the present invention.
FIG. 9 shows a user interface and loop data and definitions, in accordance with embodiment of the present invention.
FIG. 10 shows a hierarchical decomposition graph highlighting a loop, in accordance with exemplary embodiments of the present invention.

Referring to FIG. 8, a user interface is displayed and with various columns and data fields for receiving input or filling in automatically, as detailed below.

Identifying a Variable

Variable Name

The variable name is a text field (column VN) used to identify some variable and can consist of any alpha-numeric group of characters (upper and/or lower case). Spaces, decimal points, underscores, dashes, or other non-alpha-numeric characters are generally invalid.

Variable Description

The variable description is a text string (column VD) containing any mixture of characters. Although the description is not used in any evaluation, it is helpful in remembering a variable's use.

Number of Dimensions

Variables can be scalar, vector, or matrix. The number-of-dimensions field (column ND) identifies the dimensional characteristic of the variable. Scalars represent numbers (integer, real, imaginary), that is, zero-dimensional objects for this paper. Vectors represent either 1-by-n or n-by-1 matrices, that is, one-dimensional objects for this paper. A two-dimensional matrix represents an n-by-n construct (a two-dimensional object in this paper), a three-dimensional matrix is represented by an n-by-n-by-n construct (a three-dimensional object), and so on.

Dimensional Size

A dimensional size column DS represents the number of consecutive data elements per dimensions for a given variable. For example, a two-dimensional variable whose first dimension has six elements and whose second dimension has two elements, that is, a 6-by-2 matrix, would be represented as a separate size for each dimension.

Number of Indirections

Column NI displays indirections for the requirement. An indirection represents a data pointer. A data pointer is an address to a memory location rather than the data in the memory location. One level of indirection represents the address of a memory location, two levels of indirection, the address of the address of a memory location, and so on.

Levels of indirection can be de-referenced by selecting a negative indirection number after the number of indirections is defined. The data in a variable defined as having one level of indirection can be accessed by entering a −1 indirection when the variable is used in some subsequent time.

Data Type

The data type of column DT defines the kind of variable. Types include integers, floating points, strings, and others, collectively called base types. A type can also consist of any previously defined structure by use of that structure's associated work-breakdown number.

Initial Value (s)

The initial value of a variable at column IV consists of the value or values of a variable the first time that variable is used. A scalar contains a single number such as "4" or "3.15". A vector is a group of numbers such as "{1, 4, 7, 9}" or "{6.23, 9.5, 3.15}". A two-dimensional matrix is a list of numbers such as {(1, 4, 7, 9), (9, 7, 4, 1)}. Higher dimensional matrices are initialized analogously.

Dimensional Range

The dimensional range of column DR defines which elements of a vector or matrix are accessed by the current requirement. The range is used to automatically define a loop. If the associated variable is a scalar, the dimensional range simply defines an arbitrary loop using one of the existing scalar values as an index. If the associated variable is not a scalar, the dimensional range defines a loop over the vector or matrix dimensional range.

Referring to FIGS. 9-10, loop definition details are shown. FIG. 9 depicts a loop definition 121 at the user interface for a single-dimensional loop 122 starting at index value 3 and ending at index value 20, using the index variable "a". The loop definition is translated into the hierarchical decomposition graph 124 of FIG. 10.

Terminator Input/Output Variables

Figures 11, 12:
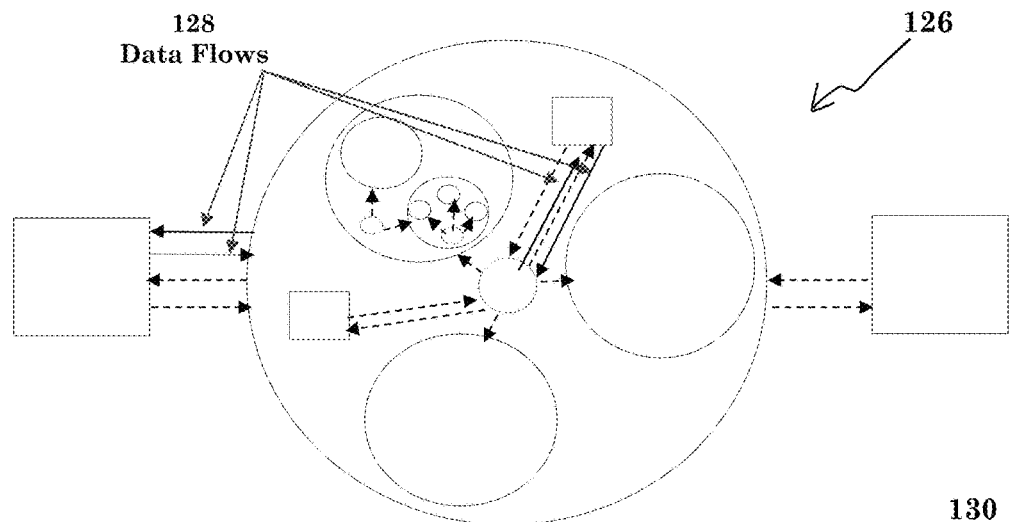
FIG. 11 shows a hierarchical decomposition graph highlighting terminator input and output variables on data flows, in accordance with exemplary embodiments of the present invention.
FIG. 12 shows a user interface region pertaining to direct display parameters, in accordance with exemplary embodiments of the present invention.

FIG. 11 provides a hierarchical decomposition graph 126, highlighting terminator input and output variables on data flows. The terminator I/O variables are used to send and receive data to and from the application. The variables are accessed via input and output data flows 128. If a named parameter associated with a terminator is used by some requirement whose work-breakdown number is greater than 0.n (e.g., 1.0 or 2.1.3), that parameter is used to interface with other systems, or humans.

Terminator Display

There can be three different ways for a terminator to save or display information: direct parameter display, print variable display, and HTML code. A display mode is selected using the parameter attached to the dataflow attached to the terminator. The direct parameter display is the default display mode and occurs if no other display mode is active and a parameter that is attached to a terminal is used.

Double-clicking a parameter name (see FIG. 12) at the topmost level shows the parameter location display (depicted interface below).

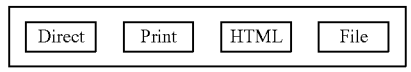

A terminator parameter list can include either Direct, Print or HTML but not more than one. Any of the location types can be co-mingled with file parameters. The first parameter display type designates the type of the other parameters.

Direct Display

FIG. 12 shows a screen shot of a user interface region 130 pertaining to the direct display parameter. Selecting the direct display does not add anything to the parameter name. Direct display means that if the parameter goes from a terminator to a process then a display showing the parameter name is automatically created that will allow a user to enter a value into the system. If the parameter goes to a terminator from a process then the value of the parameter plus the parameter name are automatically displayed to the user.

Print Display

The print display allows the parameters to be read from standard input and/or written to standard output.

Terminator_main_number>

First, the input parameter(s) is displayed to the user for entry (e.g., see above). When the data is entered, the output data is displayed (e.g., see below).

Terminator_main_number>8
Terminator_main_RETURN: 40320

HTML Display

Figures 13, 14:
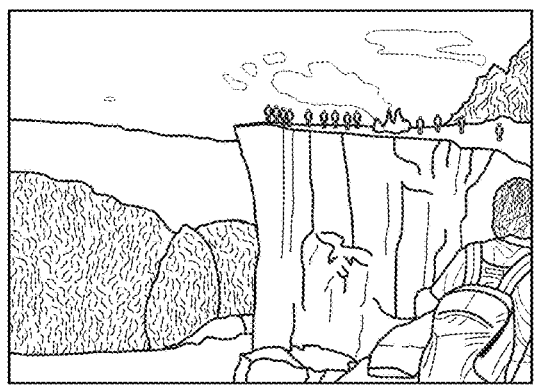
FIG. 13 shows a user interface and HTML designation field and data, in accordance with exemplary embodiments of the present invention.
FIG. 14 shows an example display of executed HTML code, in accordance with exemplary embodiments of the present invention.

Referring to FIG. 13, the HTML keyword and the URL of the HTML code are placed on the parameter field 132, identifying that input or output parameter as associated with the HTML display.

HTML is a computer language used to create web pages. Because this is a computer language, input and output parameters as well as images can be displayed. To select an HTML code, the HTML metadata display is filled in or completed.

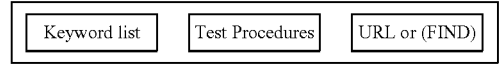

A keyword list describing the HTML code is entered. Next, one or more test procedures, and the URL of the HTML code or the FIND option, are entered to initiating having the HTML code automatically processed and located. Below is an example of HTML code, with FIG. 14 showing the displaying of executed HTML code attached to a terminator.

```
<!DOCTYPE html>
<html>
<body>
<h2>Norwegian Mountain Trip</h2>
<img border="0" src="/images/pulpit.jpg" alt="Pulpit rock"
width="304" height="228">
</body>
</html>
```

Automatically searching for HTML code and attaching it to a terminator for the present invention can occur in the same, or a similar, manner and method as disclosed in U.S. Patent Application No. 2013/0490345, which is incorporated fully herein by reference. If a user wants the system to find a usable HTML code, the FIND option is selected in the URL entry portion of the HTML metadata display screen. If the display is known by the user, the user enters the URL.

File Input/Output Variables

Figure 15:
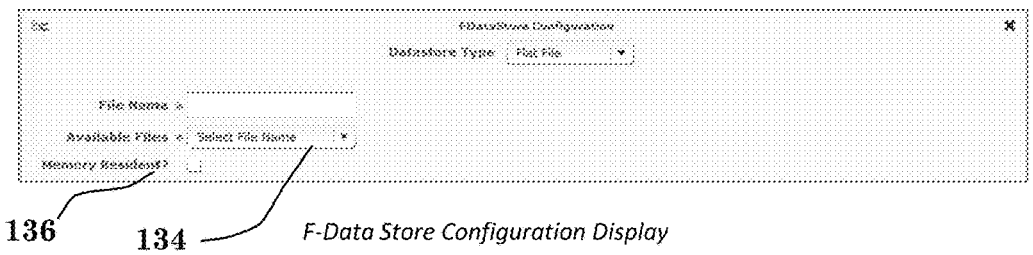
FIG. 15 shows a user interface with file data and associate fields, in accordance with exemplary embodiments of the present invention.

A file data interface with associate fields is depicted in FIG. 15. Any parameter name containing the "file:name or file:FIND" option is a variable that is associated with a file. A file is an externally defined data repository. As such, all files, like all terminators, originate from the topmost level of the hierarchical decomposition graph. The "File:name" portion of a parameter name identifies the name of the file data store defined in the graph. In order to assign a parameter to a file, a parameter name at the topmost level is double-clicked, causing the parameter location display to appear. The file option is selected to show the file data store configuration display.

The available file's pull-down list 134 shows all system-known files and the keyword "FIND". Selection of an available file causes the file name to be added to the parameter name as "file: name". The "Memory Resident" option 136 attempts to load the file into available RAM. If the file is too large for RAM, the system will attempt to "page-in" the data as required from disk or other ancillary storage. Selection of the Find option tells the system to change the requirement-associated test procedure to search for the group of input values within files with the proper file-record structure, which contains the parameter types required for the search. The expected output values become the found values. Any files that meet the search criteria will be searched consecutively whenever an application made from the currently created design is used. Multiple attached files are listed in the parameter name field as a list: file: $name_1, name_2, \ldots name_n$.

Figure 16:
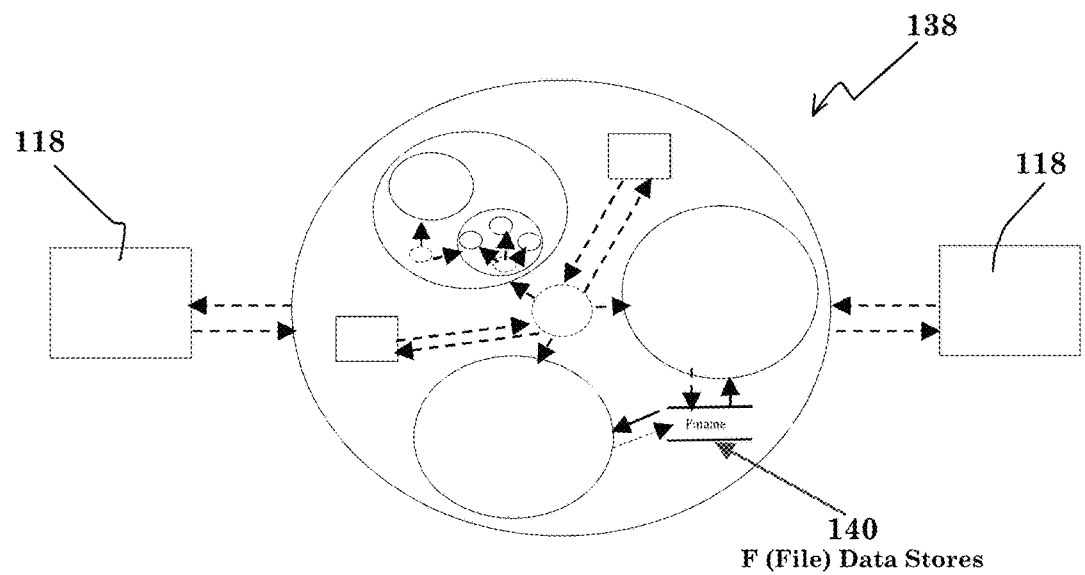
FIG. 16 shows a hierarchical decomposition graph highlighting file data stores, in accordance with exemplary embodiments of the present invention.

In addition to the standard control conditions, a file can also accept four additional types of control conditions (associated with a standard control condition): File_Open, File_Close, File_Read, and File_Write. FIG. 16 shows the hierarchical decomposition graph 138 highlighting file data stores 140.

Figure 17:
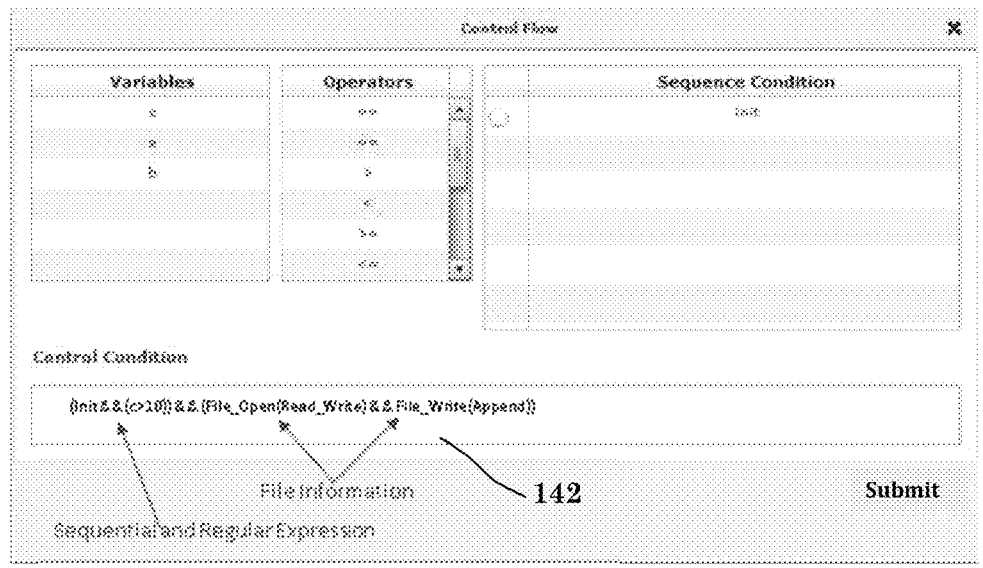
FIG. 17 shows a user interface of a control condition field defining file activity, in accordance with exemplary embodiments of the present invention.

FIG. 17 shows a user interface for the control condition field 142 defining file activity. The File_Open control option causes the attached file to open. File_Open includes Read_Only and Read_Write. Read_Only allows the records in the associated file to be read, but no new file record can be added. Read_Write allows the records in the associated file to be either read or written to. A written record is placed after the current file location.

The File_Close option causes the attached file to be closed. A File_Close is automatically issued right before any Return control.

The File_Read option allows the file record at the current location to be read. There are two sub-options: beginning and end. The "beginning" sub-option starts reading records from the beginning of the file, and the "end" sub-option reads the last record in a file.

The File_Write option causes the record to be added at the current file location. There are two sub-options: append and prefix. The "append" sub-option begins writing records at the end of the file, and the "prefix" sub-option causes the record to be added to the beginning of a file.

Data Store Input/Output Variables

Figure 18:
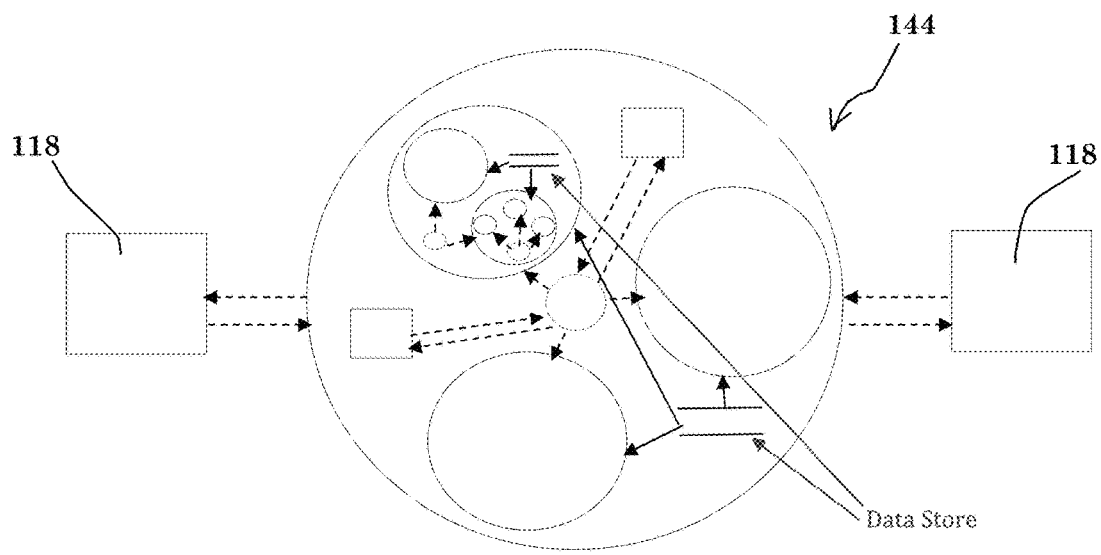
FIG. 18 shows a hierarchical decomposition graph highlighting data stores, in accordance with exemplary embodiments of the present invention.

Data store input and output variables are those parameters that are not associated with the topmost level. These variables serve as intermediate variables prior to the information being sent into or out of the system. They are stored in data stores which are depicted as parallel lines in the hierarchical graph. Information is sent to or from the processes. The applicable hierarchical decomposition graph 144 is shown in FIG. 18.

For convenience, if a data flow touches a process on one decomposition level, the information in that data store plus the data store itself are duplicated on the next-level data decomposition, if any.

Test Procedure

Referring to the user interface of FIG. 19, there can be a test procedure 146 associated with each circumstance, called a state transition 148, under which a requirement can become active, or used. For each state transition, the parameters are used as input 150, output 152, or both, depending on where they are defined. To define a test procedure, input example values are inserted for each input parameter, then the expected output value is inserted. If an identified input variable is associated with a file, it is assumed that a file open-and-read will take place during initialization. In various embodiments, the "Enter Value" portion of the input parameter will contain the words "File Defined Input Parameter" if that is the case or "Undefined Input Parameter". If an output variable is a floating point number, an acceptable error range for the expected output variable(s) can be defined. Multiple test procedures can be associated with each software requirement. Running a test procedure causes the actual received value to be saved in the actual value area.

Directly Linking Code to Requirements

The teachings herein have thus far been directed to the creation of a workable design from software requirements. The remaining disclosure describe how design is bypassed and code is directly associated with the software requirements. Direct association is possible because, as taught herein, there is a one-to-one mapping between requirements and design, and a one-to-one mapping between design and code. Rather than constructing the design, the code is hierarchically attached to each requirement. As such, the information in the machine-useable requirements can be used and processed to locate software codes that match the human-readable text of the requirement.

Finding Code

The application information of a group of requirements provides the software application description and a list of required skills for the application. The human-readable portion of a requirement provides the work-breakdown structure which is the hierarchy of the code. The machine-useable portion of the requirement provides the control, including order of execution and loops, I/O variables, including parameters, data store definitions, file definitions and I/O definitions, test procedures, displays, and the like. Combining the list of required skills with the I/O parameters and test procedures provides enough information to find specific code blocks. This processing is performed as follows:

1) A code repository or storage system(s) is searched for all code with associated skills, generating a list of codes.
2) The list of codes found is checked for any codes that do not have the required input and output parameters.
3) Any non-compliant codes are deleted from the found-code list, giving a redacted found-code list.
4) Each code found on the redacted found-code list is executed using the test procedures, giving information on minimum and maximum acceptable dataset size, processing time, and speedup (space time complexity).
5) Any code that fails any of the test procedures is deleted from the redacted found-code list.
6) Of the codes left, the code that best meets the sort criteria is selected.

The sort criteria is a weighted list of code characteristics used to select the particular code that is of interest. The characteristics can be:

| | Found Code Characteristic Sorting | |
|---|---|---|
| Characteristic # | Characteristic Name | Weighting Factor |
| 1 | Minimum acceptable input dataset size | 1-100 |
| 2 | Maximum acceptable input dataset size | 1-100 |

-continued

Found Code Characteristic Sorting

| Characteristic # | Characteristic Name | Weighting Factor |
|---|---|---|
| 3 | Processing time (smaller is better) | 1-100 |
| 4 | speedup (larger is better) | 1-100 |
| 5 | Algorithmic precision | 1-100 |

Each characteristic is assigned a weighting factor. The higher the relative weighting factor, the more likely that characteristic will determine which code is selected. All found and tested codes are sorted by their characteristics. The best code is selected for use in the final algorithm.

Connecting Found Codes

All of the selected code blocks must be connected or linked to form a final software application. The sequential and conditional control of the machine-useable portion of a software requirement and the work-breakdown structure of the human-readable portion can be processed and directly associated with code. A sequence control in a software requirement is the order in which its associated code block is activated. For example, "after 1.1" (created from the work-breakdown structure) means the code block associated with the current requirement is only active after the code block associated with requirement 1.1 is completed. "Init" means the current code block is activated as part of the initial conditions. Conditional statements in requirements are associated with "If" statements in code. For example, the control condition 1.0 requirement (found-code$_1$)(init && a>10)

can be translated to:

```
if (a > 10){
    // 1.0 requirement
    found-code₁
}
``` in the "C" or "C++" programming language. Other control conditions can be directly translated into "switch" statements. The control conditions 1.0 requirement (init && a==1)(found-code$_1$), 2.0 requirement (init && a==2)(found-code$_2$), . . . , n.0 requirement (init && a==n)(found-code$_n$)

can be translated to:

```
Switch (a) {
        case a == 1:
    // 1.0 requirement
    found-code₁
    break;
        case a == 2:
    // 2.0 requirement
    found-code₂
    break;
    ...
        case a == n:
    // n.0 requirement
    found-code_n
    break;
    default:
    break;
}
```

The above translation works because all of the variables used in the sequence conditions are the same and all of the software requirements are at the same level. Yet another control condition creates "if-else" statements, as in the following example.

1.0 requirement (found-code$_1$)(init && a>10),2.0 requirement$_2$ (found-code$_2$)(init &&~(a>10)) can be translated to:

```
if (a>10) {
    // 1.0 requirement
    (found-code₁)
} else {
    // 1.1 requirement
    (found-code₂)
}
```

The "if-else" statement is detected because both requirements are at the same work-breakdown level, the same sequence control is used, and the negative of the first requirement's control condition is used as the second requirement's control condition. The "else if" versus "else" option is generated from the following requirement.

1.0 requirement (found-code$_1$)(init && a>10), 1.1 requirement (found-code$_2$)(init && b>5) giving:

```
if (a > 10) {
    (found-code₁)
} else if (b > 5) {
    (found-code₂)
}
```

The "else-if" is one work-breakdown level lower than the preceding requirement's work-breakdown level, shares the sequencing condition, and has a different control condition.

Sequence conditions are used to link together found code that may not have a control condition. The link order is the work-breakdown structure order of the human-readable portion of the requirement. For example, 1.1 Requirement$_1$), 1.2 requirement$_2$, . . . , 1.n requirement$_n$ would associate code and become:

1.1 requirement(found-code$_1$), 1.2 requirement(found-code$_2$), . . . , 1.n requirement(found-code$_n$).

The finished, linked code would be:

```
// 1.1 requirement
Found-code
// 1.2 requirement
Found-code
...
// 1.n requirement
Found-code_n.
```

This is because none of the software requirements have a control condition and all requirements are at the same work-breakdown level.

Attaching Loops to Found Code

Referring to FIG. 20, the input and output parameters that are part of a software requirement's machine-usable portion can contain a variable's number of dimensions 154, the maximum dimension size 156, and a dimension's accessed range 158. This is enough information to define "for" loops. If there is no dimensional range, the starting range value is initialized to zero and the maximum index value is initialized to the maximum dimension size. If there is a dimension, the minimum range value becomes the starting index value and the maximum range becomes the maximum index value.

The dimension number becomes the index number.

The machine-usable requirements portion detailed above and depicted in FIG. 20 generates the following code:

```
for (index1 = 20; index1 <= 40; index1++) {
    for (index2 = 0; index2 <= 20; index2++) {
        // 1.2 Requirement
            found-code
    }
}
```

"While" loops continue to loop until some condition is met. Therefore, a "while" loop is generated from the control portion of the machine-usable part of a requirement. For example, 1.0 requirement (found-code$_1$)(init && a>10,while)) creates the following code:

```
While (a > 10) {
    // 1.0 requirement
        Found-code₁
}
```

The "do-while" loops, like "while" loops, continue until some condition is met. Unlike the "while" loop, the "do-while" tests the loop condition after the code has been executed. For example, 1.0 requirement (found-code$_1$)(init && while, a>10) creates the following code:

```
do {
    // 1.0 requirement
        Found-code₁
} while (a > 10);
```

Adding Data Stores (Data Structures) to Found Code

Referring generally to FIG. 21, most modern computer languages use the concept of a data structure. A data structure is a definition of an associated, memory-resident group of constants, variables, strings, arrays, matrices, and other structures. As stated previously herein, each machine-usable portion of a requirement contains input and output parameter definitions. The output definition can have a single parameter that is designated the function-output parameter. All other output parameters must be designated as "pass by reference" 160. In the C language, pass-by-reference parameters are shown as pointers. In the software requirement, pass by reference is shown as a level of indirection. One level of indirection means the parameter represents an address to the data, two levels of indirection means that the parameter represents an address to an address of the data, etc. De-referencing an indirection means to access the address of the indirect parameter. One level of de-referencing a parameter with one level of indirection means that the value of the defined data type is accessed. De-referencing occurs when a parameter is used. A structure's name is the work-breakdown number of the human-readable portion of the requirement. Each parameter name must be unique for each requirement, allowing the detection of the parameter movement between requirements.

If the above-referenced machine-readable requirement input-parameter definition has the "1.0" as its work-breakdown number, the following structure is created:

```
Struct _1_0 {
    int *a;           //Scalar, integer pointer
    int b [40][20];   // Matrix, 2D-integer array
};
```

The initial-value field of the machine-readable requirement performs an initialization 162 on a structure's values, as shown in FIG. 22.

Adding the initialization value "40" changes the structure declaration to:

```
Struct _1_0 {
    int a = 40;       //Scalar, integer
    int b [40][20];   // Matrix, 2D-integer array
};
```

In order to use variables in a structure defined in a different requirement, a work-breakdown number 164 is added to the parameter's name that is different from the current requirement's work-breakdown number. Entering a valid work-breakdown number and parameter in the corresponding parameter area automatically causes the "Struct" (structure) data type 166 to be selected, as depicted in FIG. 23.

Passing Requirement Parameters

Since each parameter is unique within each requirement, it is possible to process and determine when a parameter is being created and when it is being transferred to a different requirement ("passed"). Codes are connected together via control conditions. The chain of linked control conditions forms a dependency path. The first time a parameter is found along a dependency path for each parameter area (input or output) is the definition point for that parameter. Further, the input and output relationship between requirements of the same work-breakdown level alternate. That is, the input of one requirement is the output of a preceding requirement, unless the first along the dependency path is the one being analyzed. Any input parameter that is an output parameter of a preceding requirement could represent data passing. The data passing typically occurs through scoped, global data storage. Scoped, global data storage means that the defined data storage is allocated at some work-breakdown level and is accessible at that level or below.

For example, 1.1 Requirement$_1$, 1.2 requirement$_2$(input parameter a, output parameter a), . . . , 1.n requirement$_n$ means that requirements 1.2.1, 1.2.2, . . . , 1.2.n can all use parameter "a", but requirement 1.1 through 1.n, excluding 1.2 internal use, cannot use the parameter "a". Thus, the scope of parameter "a" includes the requirement 1.2 sub-requirements only. If the input parameter "a" definition, from above figure, does not have "1.0" as its work-breakdown number, the parameter designated "1.0 a" means the value from output parameter "a" of the requirement with work-breakdown number 1.0 is used. Passing data requires information that states from where a parameter originates. In addition to variables, parameters can also be arrays or pointers.

Passing Single Dimensional Arrays and Single Pointers

A single-dimensional array is similar to but not the same as a pointer.

char a[ ]="string";
produces:

a:

char*b="string";
produces:

b:

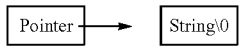

Whereas an array always points to the same memory location, a pointer can point to any memory location. Therefore, an array can be thought of as the special case where a pointer only points to a particular fixed address, whereas a true pointer can be thought of as the general case, allowing a pointer to point to any address. Since functions "pass by value", passing either a string or a pointer is actually passing the value of the address into the function. This allows both arrays and pointers to be cast as either arrays or pointers in a function declaration.

Passing Multi-Dimensional Arrays and Pointers of Pointers

A two-dimensional array is really a one-dimensional array of arrays.

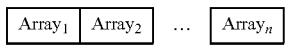

When a two-dimensional array is passed to a function, its row and column size must be included. However, there are three standard ways for this to be presented:

Function (int a[10][12]) { ... } or Function (int [ ] [12] { ... } or Function (int (*a)[12]) { ... }

The standard rectangular subscript calculation for a two-dimensional array is "column size times row index plus column index". This means that any two-dimensional-array element can be represented within a function declaration with one pointer and three variables.

Function (int*a, a-column-size, a-row-index, a-column-index) { ... }

The entire array can be transmitted with one pointer and two variables.

Function (int*a, a-column-size, a-row-size) { ... }

Adding Files to Found Code

Files, like code, can be automatically searched and found with the system 10. Finding a file requires the identification of the needed variables in each file record, some descriptive element for the file, and that the file can be tested for correctness. There are two types of files: standard I/O and defined files.

Standard Input/Output

Referring to FIG. 24, the concept of a standard input device and a standard output device goes back to the use of data terminals for input and output. Standard I/O is used by many computer languages and helps to simplify reading and writing to a terminal-type device. More generally, standard I/O offers a simplified way to read and write files.

When the keyword "get" is entered into the control condition of the machine-usable portion of a software requirement, an ASCII character is read from standard I/O and placed into a 32-bit integer (low-order portion). If the "get" assignment is preceded by a condition using the same variable, then a "while" loop is designated. Similarly, when the keyword "put" is entered into the control condition of the machine-usable portion of a software requirement, an ASCII character is written into standard I/O as a 32-bit integer (low-order portion). The keyword "EOF" designates the end-of-file character, which has the value −1.

The Control Statement loop(c !=EOF)(c=get)

becomes:

While ((c=getchar ( )) !=EOF);

in the C-language. The control statement loop(c<=10)(put=c)

becomes:

while (c<=10)
putchar(c);

which is a system-detectable infinite loop and would flag an error because the value of the variable "c" never changes in the loop.

Defined Files

Figure 25:
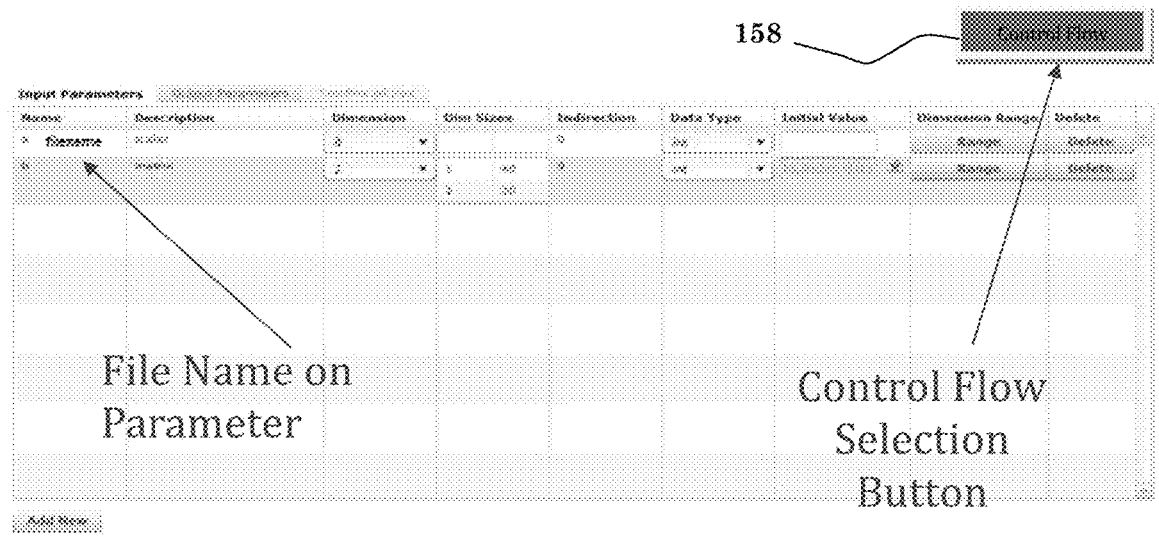
FIG. 25 shows a user interface highlighting file record parameters and control flow selector of a machine readable requirement, in accordance with exemplary embodiments of the present invention.
Figure 26:
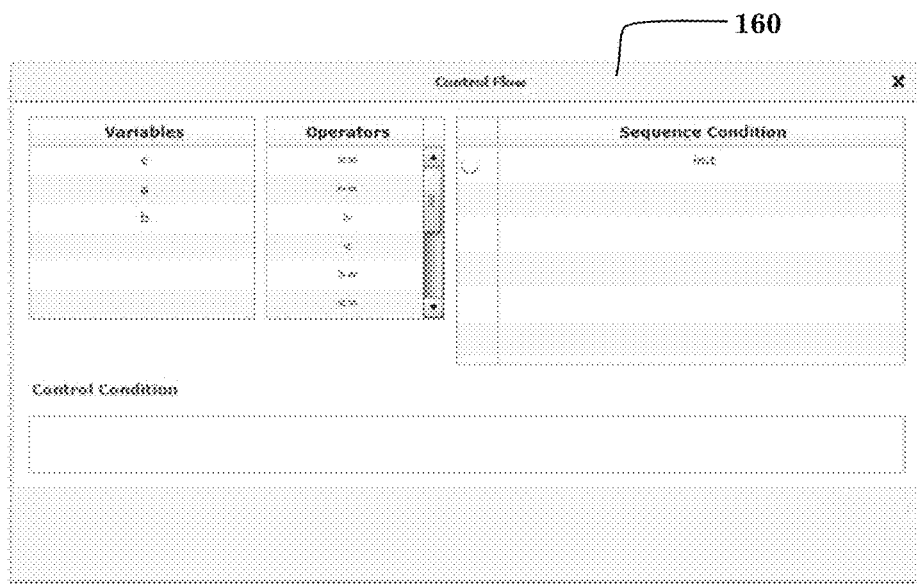
FIG. 26 shows a user interface depicting control flow selection, in accordance with exemplary embodiments of the present invention.

Referring to FIGS. 25-26, a file's definition is given in the input or output parameters of a software requirement by attaching the file name to the parameter name. This identifies the parameter as belonging to the named file.

Reading and writing to/from a file will only move data to/from file parameters designated in the input or output parameter area. The actual file "read" or "write" is designated on the control-flow designation. Selecting the "Control Flow" button of the user interface causes the "Control Flow" 160 to appear (FIG. 26).

The Control Condition (init && ((a>10) open{filename} write{filename, b}))

produces the following C-language code:

```
// File setup information
#define NULL      0       // Pointer value for error reporting
#define EOF      -1       // End of file
#define RWMODE 2          // Open file mode RW
#define PMODE    0755     // File RW mode for owner and file RW mode for group
#define FILEBUFF 512      // Standard file buffer size
int  filename;            // File handle location
```

```
char filename_BUFF [FILEBUFF]    // File buffer location
// Variable definitions
Int a, int b, int c;
// Open file FILENAME if it exists or create it
If (init && (a > 10) )
    If (filename = open ("filename", RWMODE) == -1))
        filename = creat ("filename", PMODE);
    itoa (b, filename_BUFF);
    if (write (filename, filename_BUFF, sizeof (int) != sizeof(int)) error ("write error",
NULL);
```

Similarly, the control condition
(init && ((a<=10) open{filename} loop(c !=EOF) read{filename, c}))
produces the following C-language code:

```
// File setup information
#define NULL     0       // Pointer value for error reporting
#define EOF      -1      // End of file
#define RWMODE 2         // Open file mode RW
#define PMODE    0755    // File RW mode for owner and file RW mode for group
#define FILEBUFF 512     // Standard file buffer size
int   filename;          // File handle location
char *c  ;               // File buffer location
// Variable definitions
Int a, int b;
*c = NULL;
// Open file FILENAME if it exists or create it
If (init && (a > 10))
    If (filename = open ("filename", RWMODE) != -1))
        while ( *c != EOF) read (filename, c, 1);
```

The Control Condition (callafter$_{name}$ close {filename})

produces the following C-language code:

```
// File setup information

Int filename;        // File handle location

// Close file FILENAME
```

```
If (Callafter_name)
    Close (filename);
```

It is possible to read and write formatted data as well. For example, (init && ((a<=10) format_open{filename} (c !=EOF) formatted_read{filename, c, b}))
produces the following C-language code:

```
// File setup information
#define NULL     0       // Pointer value for error reporting
#define EOF      -1      // End of file
#define PMODE    0755    // File RW mode for owner and file RW mode for group
#define FILEBUFF 512     // Standard file buffer size
FILE *filename;          // File pointer location
// Variable definitions
Int a, int b, int c;
// Open file FILENAME if it exits and read from it
If (init && (a <= 10))
    If (filename = fopen ("filename", "r") != NULL))
        if (c != EOF) fscanf (filename," %i %i", c, d);
```

The control condition
    (init && ((a<=10) format_open{filename} (c !=EOF) formatted_write{filename, c, b}))
produces the following C-language code:

```
// File setup information
  #define NULL        0       // Pointer value for error reporting
  #define EOF        -1       // End of file
  #define PMODE       0755    // File RW mode for owner and file RW mode for
group
  #define FILEBUFF 512         // Standard file buffer size
  FILE *filename;              // File pointer location
// Variable definitions
  Int a, int b, int c;
// Open file FILENAME if it exists and write to the file
  If (init && (a <= 10))
      If (filename = fopen ("filename", "a") != NULL))
          if (c != EOF) fprintf (filename," %i %i", c, d);
```

File random access is possible using the "seek" condition. For example,
    (init && ((a<=10) format_open{filename} position(3) formatted_write{filename, c, b})
which produces the following C-language code:

```
// File setup information
  #define NULL        0       // Pointer value for error reporting
  #define EOF        -1       // End of file
  #define PMODE       0755    // File RW mode for owner and file RW mode for
group
  #define FILEBUFF 512          // Standard file buffer size
  FILE *filename;               // File pointer location
  Long filename_offset;         // File position
// Variable definitions
  Int a, int b, int c;
// Open file FILENAME if it exists and point to the third file record and write to
the file
  If (init && (a <= 10))
      If (filename = fopen ("filename", "a") != NULL)) {
          filename_offset = 3;
          fseek (filename, filename_offset, 0);
          fprintf (filename," %i %i", c, d);
      }
```

Automatic Detection and Removal of Unrequired Code Elements

Figure 27:
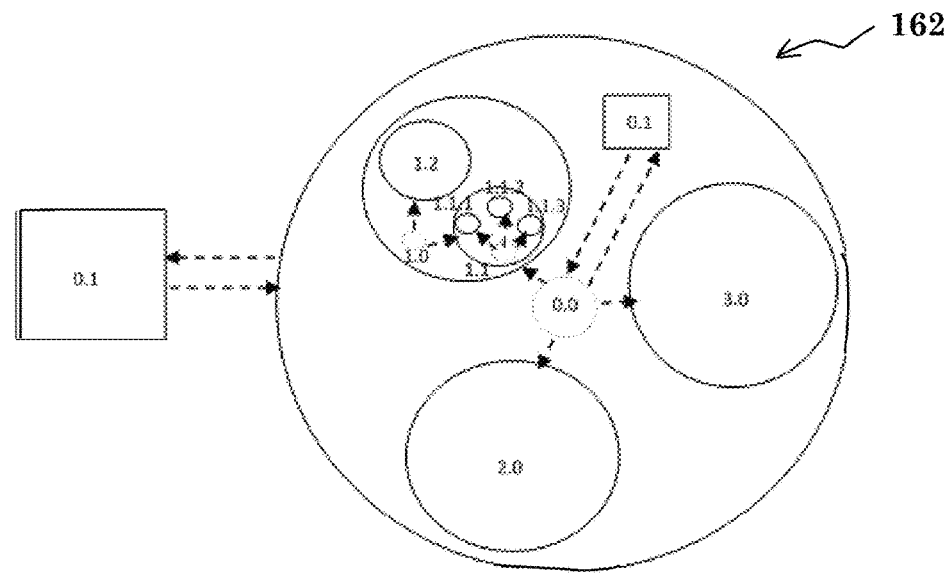
FIG. 27 shows a hierarchical decomposition graph highlighting search requirements structure, in accordance with exemplary embodiments of the present invention.
Figure 28:
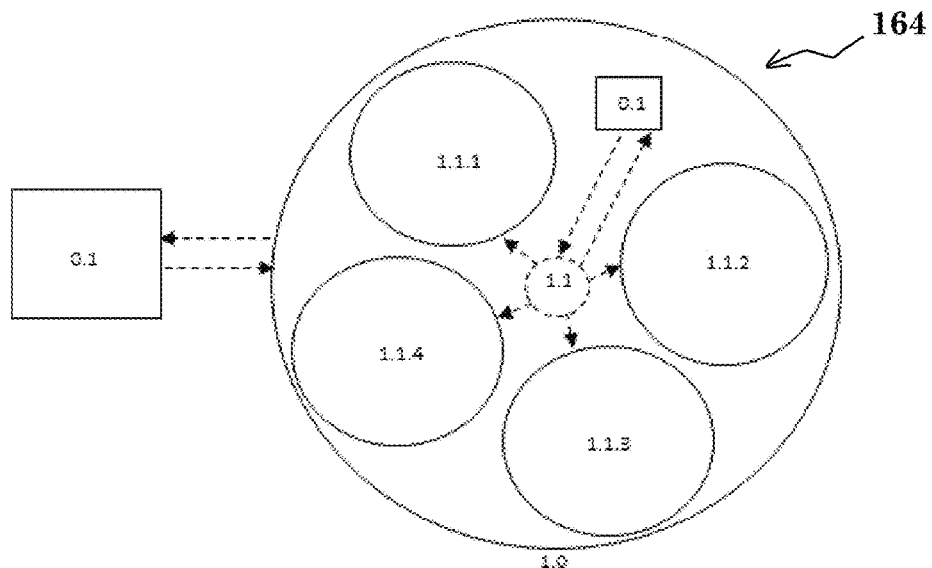
FIG. 28 shows a hierarchical decomposition graph highlighting found code requirement structure, in accordance with exemplary embodiments of the present invention.

Referring to FIGS. 27-28, because the system 10 can automatically find and attach code to a software requirement via the use of input/output parameter analysis combined with testing, any code attribute that does not affect the outcome of the code-to-requirement associated tests is not considered in the code-selection process. This means that unintended attributes, including malware, could potentially be introduced into the application with no way to detect the unwanted functionality.

To avoid this problem, the found code is first converted into its own set of hierarchical requirements and then its requirement structure is compared to the structure of the original requirements used to search for code to attach. If all original requirements are met then any found structural elements in the requirements of the found code that are not present in the original requirement's structure can elicit one of five responses: 1) found differences are ignored and all code is attached, 2) found differences are removed and only the code with the matching requirement structure is attached, 3) the entire found code associated with any differences is not attached, 4) found differences are replaced by error-handling code and is attached, or 5) operator action is requested.

As an example, FIG. 27 shows the structure 162 of a set of software requirements. Accordingly, the requirements used for search purposes have multiple requirement pathways:

1) 0.0 to 1.0 to 1.1 to 1.1.1
2) 0.0 to 1.0 to 1.1 to 1.1.2
3) 0.0 to 1.0 to 1.1 to 1.1.3
4) 0.0 to 1.0
5) 0.0 to 2.0
6) 0.0 to 3.0

New code that has been found might generate the requirement structure 164 of FIG. 28. This represents the requirement structure of code that matched the parameters and tests of pathway #4. The problem is the structure of code has an extra requirement, 1.1.4. This extra requirement would cause a "found structural difference" condition to occur. Depending on the system settings, one of the five responses discussed above is initiated or activated to address the problem.

As detailed herein, the present invention and disclosure demonstrates that it is possible to automatically find, test and attach code directly to requirements and that the requirements can be used to define, find, test and attach files and input/output interface displays to form new software applications.

The devices or computing systems used and adapted to process and carry out the aspects and software system of the present invention may include a processor, which may include one or more microprocessors and/or one or more circuits, such as an application specific integrated circuit (ASIC), field-programmable gate arrays (FPGAs), etc. Further, the devices can include a network interface. The network interface is configured to enable communication with a communication network and servers, using a wired and/or wireless connection.

The devices or computing systems may include memory, such as non-transitive, which may include one or more non-volatile storage devices and/or one or more volatile storage devices (e.g., random access memory (RAM)). In instances where the devices include a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input device is configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile device screens, tablet screens, speakers, remote screens, etc. The output device can be configured to display images, media files, text, or video, or play audio to a user through speaker output.

Server processing systems for use or connected with the system 10 of the present invention, can include one or more microprocessors, and/or one or more circuits, such as an application specific integrated circuit (ASIC), field-programmable gate arrays (FPGAs), etc. A network interface can be configured to enable communication with a communication network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable medium, such as, but not limited to magnetic media (e.g., a hard disk), optical media (e.g., a DVD), memory devices, etc.

While various embodiments have been described above, it should be understood that they have been presented by way of example only, and not limitation. Thus, the breadth and scope of the present disclosure should not be limited by any of the above-described embodiments or examples. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of creating a resulting software application, comprising:
   receiving software requirements via a requirements input, including at least a description of the resulting software application, a list of required skills for the resulting software application, and one or more code comments;
   extracting one or more timing requirements from one or more requirement source code files and associating the one or more timing requirements with the software requirements;
   accessing one or more source code files;
   processing the one or more source code files and the one or more code comments to positively identify at least one of the one or more source code files having compliant input and output parameters based on the software requirements; and
   generating a computer executable file including the at least one positively identified source code file.

2. The method of claim 1, wherein receiving software requirements includes receiving data entered from a user via an input device.

3. The method of claim 1, wherein receiving software requirements includes receiving data from one or more requirement source code files and extracting a plurality of extractable requirements therefrom.

4. The method of claim 3, wherein the one or more requirement source code files are stored on a local storage device.

5. The method of claim 3, wherein the one or more requirement source code files are accessed via the Internet.

6. The method of claim 1, further including processing the one or more source code files to identify non-compliant code.

7. The method of claim 1, further including comparing the one or more source code files to a sort criteria.

8. The method of claim 7, wherein characteristics for the sort criteria are assigned a weighting factor.

9. The method of claim 1, further including scanning the at least one positively identified source code file and identifying one or more unrequired code elements.

10. The method of claim 1, wherein the software requirements include a human readable component and a machine usable component.

11. The method of claim 1, wherein the software requirements include a plurality of hierarchical components.

12. The method of claim 11, further including creating a work breakdown structure and processing the work breakdown structure to define the hierarchical components.

13. The method of claim 1, further including extracting requirement hierarchy from one or more requirement source code files.

14. The method of claim 1, further including linking together a plurality of extracted requirements from one or more requirement source code files.

15. A method of creating a resulting software application, comprising:
- extracting one or more software requirements from one or more requirement source code files;
- extracting one or more timing requirements from the one or more requirement source code files and associating the one or more timing requirements with the one or more software requirements;
- accessing one or more source code files;
- processing one or more code comments and the one or more source code files to positively identify at least one of the one or more source code files having compliant input and output parameters based on the software requirements; and
- generating a computer executable file including data from the at least one positively identified source code file.

16. The method of claim 15, further including extracting requirement hierarchy from the one or more requirement source code files.

17. The method of claim 15, further including linking together a plurality of the one or more software requirements.

18. A method of creating a resulting software application, comprising:
- extracting one or more software requirements and one or more timing requirements from one or more requirement source code files;
- associating the one or more timing requirements with the one or more software requirements;
- accessing one or more source code files;
- processing the one or more source code files to positively identify at least one of the one or more source code files having compliant input and output parameters based on the software requirements; and
- generating a computer executable file including data from the at least one positively identified source code file.

19. The method of claim 18, wherein the one or more software requirements include a human readable component and a machine usable component.

20. The method of claim 18, wherein the one or more requirement source code files are accessed via the Internet.

* * * * *